United States Patent
Wakita et al.

(10) Patent No.: US 8,943,324 B2
(45) Date of Patent: Jan. 27, 2015

(54) GREEN ENERGY GENERATION APPARATUS, MOBILE DEVICE, ELECTRIC STORAGE APPARATUS, AND MANAGEMENT METHOD OF GREEN ENERGY INFORMATION

(75) Inventors: Yoshihiro Wakita, Tokyo (JP); Jun Nakano, Tokyo (JP); Masaru Kuramoto, Kanagawa (JP); Yutaka Imai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/576,371

(22) PCT Filed: Jan. 20, 2011

(86) PCT No.: PCT/JP2011/000284
§ 371 (c)(1),
(2), (4) Date: Jul. 31, 2012

(87) PCT Pub. No.: WO2011/099237
PCT Pub. Date: Aug. 18, 2011

(65) Prior Publication Data
US 2013/0007458 A1    Jan. 3, 2013

(30) Foreign Application Priority Data

Feb. 9, 2010    (JP) .................................. 2010-026563

(51) Int. Cl.
*H04L 9/32* (2006.01)
*G06Q 50/06* (2012.01)
(Continued)

(52) U.S. Cl.
CPC ............... *G06Q 50/06* (2013.01); *G06Q 30/04* (2013.01); *H04L 63/0823* (2013.01); *H02J 3/008* (2013.01); *H02J 7/35* (2013.01); *Y04S 50/10* (2013.01); *Y04S 40/24* (2013.01); *H02J 3/383* (2013.01); *H02J 3/386* (2013.01); *Y04S 10/60* (2013.01); *Y04S 50/12* (2013.01); *Y02E 10/563* (2013.01); *Y02E 10/566* (2013.01); *Y02E 10/763* (2013.01); *H02J 3/382* (2013.01)
USPC ........................................................ 713/175

(58) Field of Classification Search
None
See application file for complete search history.

(56) References Cited

U.S. PATENT DOCUMENTS

| 2004/0107025 A1 | 6/2004 | Blackett et al. |
| 2008/0091590 A1 | 4/2008 | Kremen |

(Continued)

FOREIGN PATENT DOCUMENTS

| EP | 1 228 490 | 8/2002 |
| JP | 57-122625 | 7/1982 |

(Continued)

OTHER PUBLICATIONS

English-language International Search Report from the Japanese Patent Office in PCT International Application No. PCT/JP2001/000284, mailed Mar. 1, 2001.

(Continued)

*Primary Examiner* — Brandon Hoffman
(74) *Attorney, Agent, or Firm* — Finnegan, Henderson, Farabow, Garrett & Dunner, L.L.P.

(57) ABSTRACT

A method is provided for authenticating characteristics of electrical energy. The method comprises acquiring a key, acquiring an amount of electrical energy, and generating a digital signature based on the amount and the key. The method further comprises generating a certificate comprising the signature and the amount.

22 Claims, 21 Drawing Sheets

(51) Int. Cl.
  *G06Q 30/04* (2012.01)
  *H04L 29/06* (2006.01)
  *H02J 3/00* (2006.01)
  *H02J 7/35* (2006.01)
  *H02J 3/38* (2006.01)

(56) References Cited

U.S. PATENT DOCUMENTS

| | | | |
|---|---|---|---|
| 2009/0234757 | A1 | 9/2009 | Tarbell et al. |
| 2011/0093396 | A1* | 4/2011 | Parkos et al. ............ 705/63 |

FOREIGN PATENT DOCUMENTS

| | | |
|---|---|---|
| JP | 2000-011114 | 1/2000 |
| JP | 2001-306755 | 11/2001 |
| JP | 2003-108655 | 4/2003 |
| JP | 2004-145534 | 5/2004 |
| JP | 2005-185016 | 7/2005 |
| JP | 2007-089317 | 4/2007 |
| JP | 2007-094732 | 4/2007 |
| JP | 2008-021152 | 1/2008 |
| JP | 2008-225755 | 9/2008 |
| JP | 2010-130730 | 6/2010 |
| JP | 2001-306755 | 2/2011 |
| WO | WO 01/35351 | 5/2001 |
| WO | WO 2006/059195 | 6/2006 |

OTHER PUBLICATIONS

Written Opinion of the International Searching Authority from the Japanese Patent Office in PCT International Application No. PCT/JP2011/000284 mailed Mar. 1, 2001.

* cited by examiner

GREEN ENERGY GENERATION APPARATUS, MOBILE DEVICE, ELECTRIC STORAGE APPARATUS, AND MANAGEMENT METHOD OF GREEN ENERGY INFORMATION

TECHNICAL FIELD

The present invention relates to a green energy generation apparatus, a mobile device, an electric storage apparatus, and a management method of green energy information.

BACKGROUND ART

The global environment has been worsening seriously in recent years, and each country has been taking environmental measures. Under such circumstances, an energy generation method using renewable energy, such as solar energy, wind energy, geothermal energy (hereinafter, referred to as the renewable energy generation method), and an energy generation method using environmentally friendly resources, such as biomass energy, fuel cell, and the like (hereinafter, referred to as the environmentally friendly energy generation method) are drawing a great deal of attention. At present, a thermal energy generation method using fossil fuels, such as oil, coal, and the like, a nuclear energy generation method using atomic energy, and a hydroelectric energy generation method using flowing water are mainly used.

The nuclear energy generation method is an environmentally friendly energy generation method, but has difficulties and risks in the safety of managing atomic fuels. The hydroelectric energy generation method is also environmentally friendly; however, only areas with geographical conditions suited for constructing dams, or the like, can utilize this method. The thermal energy generation method is facing problems, such as the drain of fossil fuels, emissions of $CO_2$, $NO_x$, and the like, generated from burning fossil fuels. In light of the circumstances, replacing the thermal energy generation method with the renewable energy generation method or the environmentally friendly energy generation method is under discussion.

In recent years, individual electric energy consumers have become more conscious of global environmental issues, and there is a movement to use an energy generator to implement the renewable energy generation method or the environmentally friendly energy generation method (hereinafter, referred to as a green energy generation apparatus) in a household. Further, in order to resolve problems of instability in the supply of energy, which is a weak point of the renewable energy generation method, there is also a movement to use an electric storage apparatus in a household along with the energy generator implementing the renewable energy generation method. In other words, individual electric energy consumers are obtaining the green energy generation apparatus and the electric storage apparatus for their households at a rapid pace. In the near future, a greater number of individual electric energy consumers will generate electric energy in their households, and cover their own consumption with the electric energy they generate themselves.

At present, electric utility companies are buying the surplus electricity that individual electric energy consumers generate but cannot consume themselves. However, for the electric utility companies, the electricity generated by individual electric energy consumers is an unstable energy source, the capacity and timing of supply being unpredictable. Such electricity is not attractive for the electric utility companies, so the prices of electricity sold to electric utility companies from individual electric energy consumers tend to be low. The amount of electricity produced by each of the individual electric energy consumers is extremely small compared to the capacity currently traded in the energy trading market; therefore, individual electric energy consumers cannot sell the electricity in the energy trading market in the present situation.

Further, the existing energy trading market comprises limited players. In fact, it is practically impossible for individual electric energy consumers to trade in the energy trading market. Regarding electricity trading, Japanese Unexamined Patent Application Publication No. 2008-225755 discloses a method for predicting precisely the amount of electricity to sell and to buy based on past trading history in the energy trading market. Regarding the structure of the current electricity trading, information distributed from the Japan Electric Power Exchange, the Chicago Mercantile Exchange (CME), or the like, must be useful.

CITATION LIST

Patent Literature

PTL 1: Japanese Unexamined Patent Application Publication No. 2008-225755

SUMMARY OF INVENTION

Technical Problem

Under the circumstances, it is expected that a structure effectively utilizing the electricity generated by individual electric energy consumers using green energy generation apparatuses (hereinafter, referred to as green electricity) will be realized. It is also expected that an energy trading market of a small size, which individual electric energy consumers can join, will be realized. For example, an energy community, where individual electric energy consumers can accommodate each other with electricity by trading their surplus electricity, is desired for each local area. In order to realize this, however, there are many issues to be resolved, such as how each individual electric energy consumer can be identified, how arbitrage prices of electric energy should be decided, and the like. A structure that resolves these issues is also expected.

In light of the foregoing, it is desirable to provide a green energy generation apparatus, a mobile device, an electric storage apparatus, and a management method of green energy information, which are novel and improved, and which are capable of generating a certificate to authenticate green energy.

Solution to Problem

Accordingly, there is provided a method for authenticating characteristics of electrical energy. The method comprises acquiring a key, acquiring an amount of electrical energy, and generating a digital signature based on the amount and the key. The method further comprises generating a certificate comprising the signature and the amount.

In another aspect, there is provided an apparatus for authenticating characteristics of electrical energy. The apparatus comprises an energy generator and a processor configured to acquire a key, acquire an amount of electrical energy generated by the energy generator, and generate a digital signature based on the amount and the key.

Consistent with the description above, it is possible to build a structure to generate a certificate to authenticate green energy.

BRIEF DESCRIPTION OF DRAWINGS

FIG. 21 is an explanatory diagram for illustrating an example of a hardware configuration capable of realizing functions of various types of certificate issuance units, interface apparatuses, mobile devices, energy trade servers, or the like.

DESCRIPTION OF EMBODIMENTS

Figure 1:
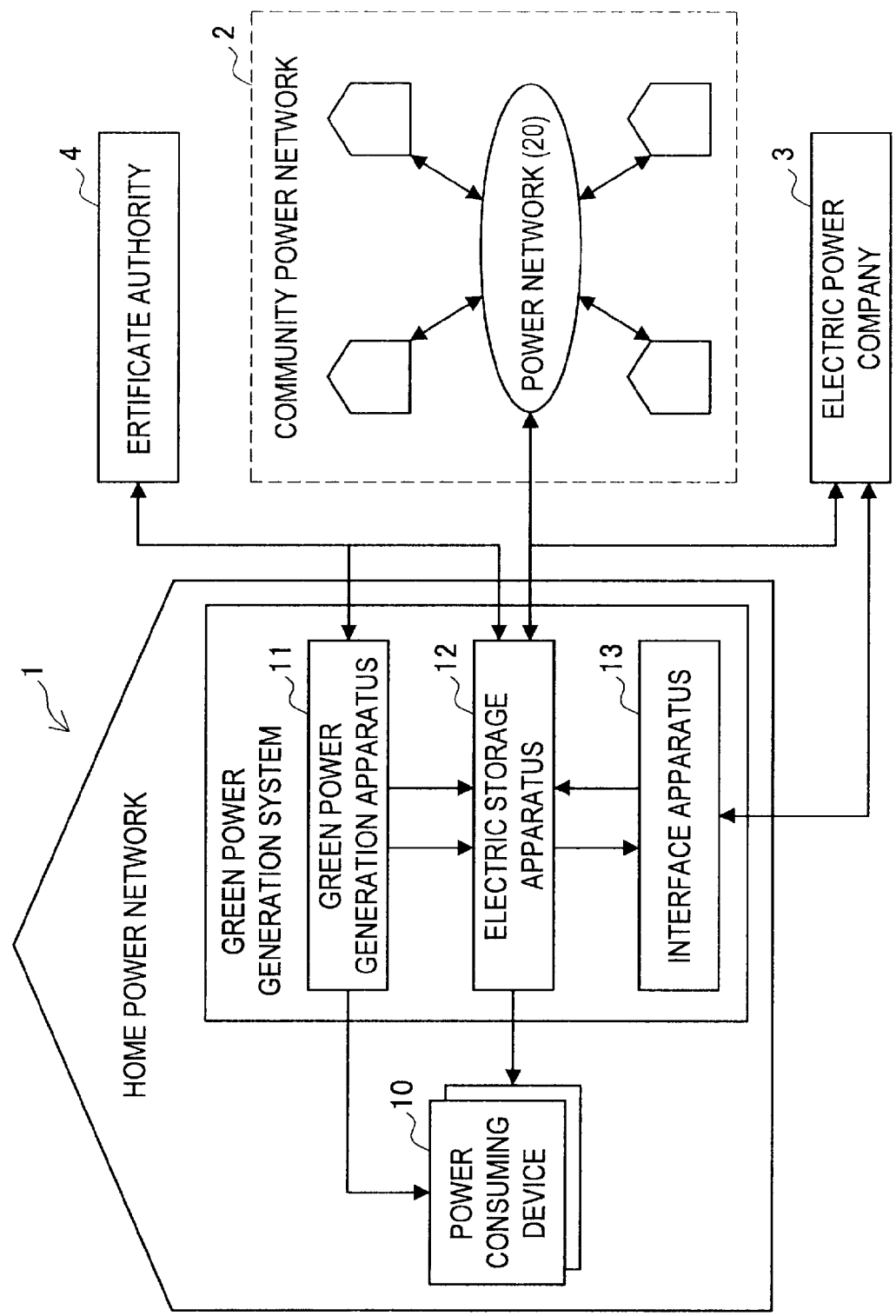
FIG. 1 is an explanatory diagram for illustrating a configuration of a green energy generation system consistent with the first embodiment of the present invention.

Hereinafter, embodiments will be described in detail with reference to the appended drawings. Note that, in this specification and the appended drawings, structural elements that have substantially the same function and structure are denoted with the same reference numerals, and repeated explanation of these structural elements is omitted.

(Flow of Explanation)

Figure 4:
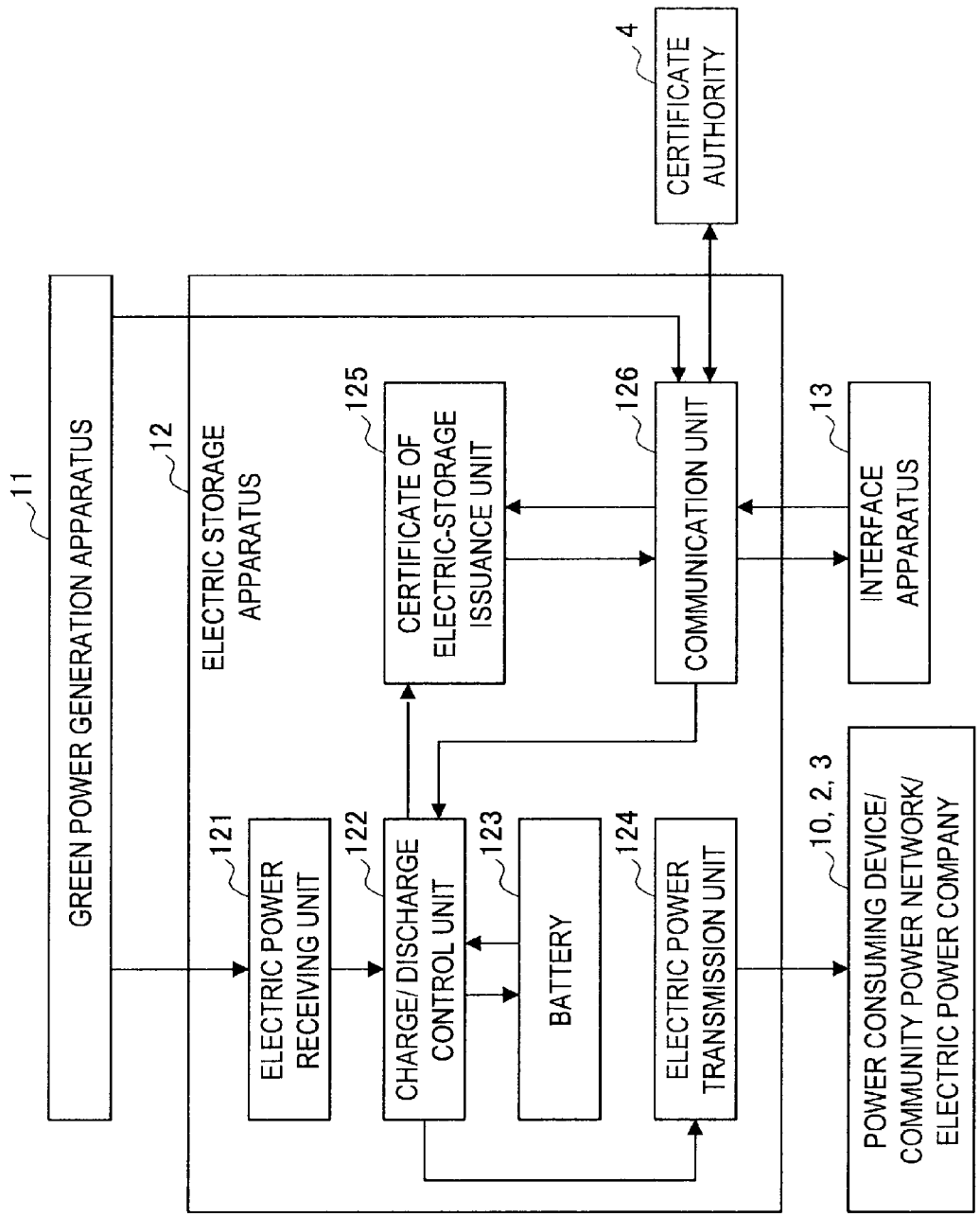
FIG. 4 is an explanatory diagram for illustrating a functional configuration of an electric storage apparatus according to the present embodiment.
Figure 5:
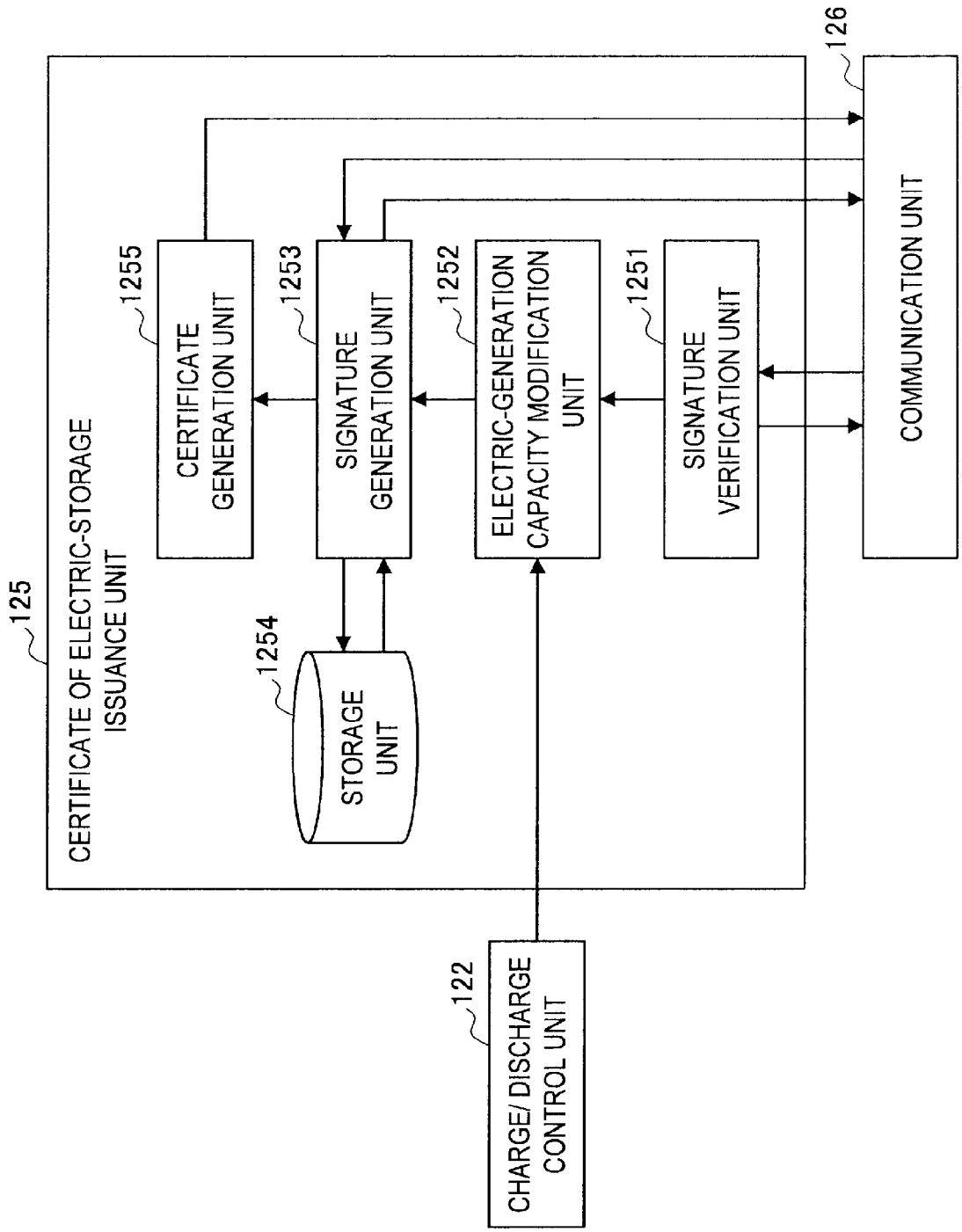
FIG. 5 is an explanatory diagram for illustrating a functional configuration of a certificate of electric-storage issuance unit according to the present embodiment.

The flow of explanation described below regarding the embodiment will be explained in brief. At first, an explanation will be given regarding a configuration of a home energy network 1 according to the first embodiment with reference to FIG. 1. Then, with reference to FIG. 2 and FIG. 3, an explanation will be given regarding a green energy generation apparatus 11 according to the present embodiment. With reference to FIG. 4 and FIG. 5, an explanation will be given regarding a configuration of an electric storage apparatus 12 according to the present embodiment. With reference FIG. 6, an explanation will be given regarding a configuration of an interface apparatus 13 according to the present embodiment.

Figure 8:
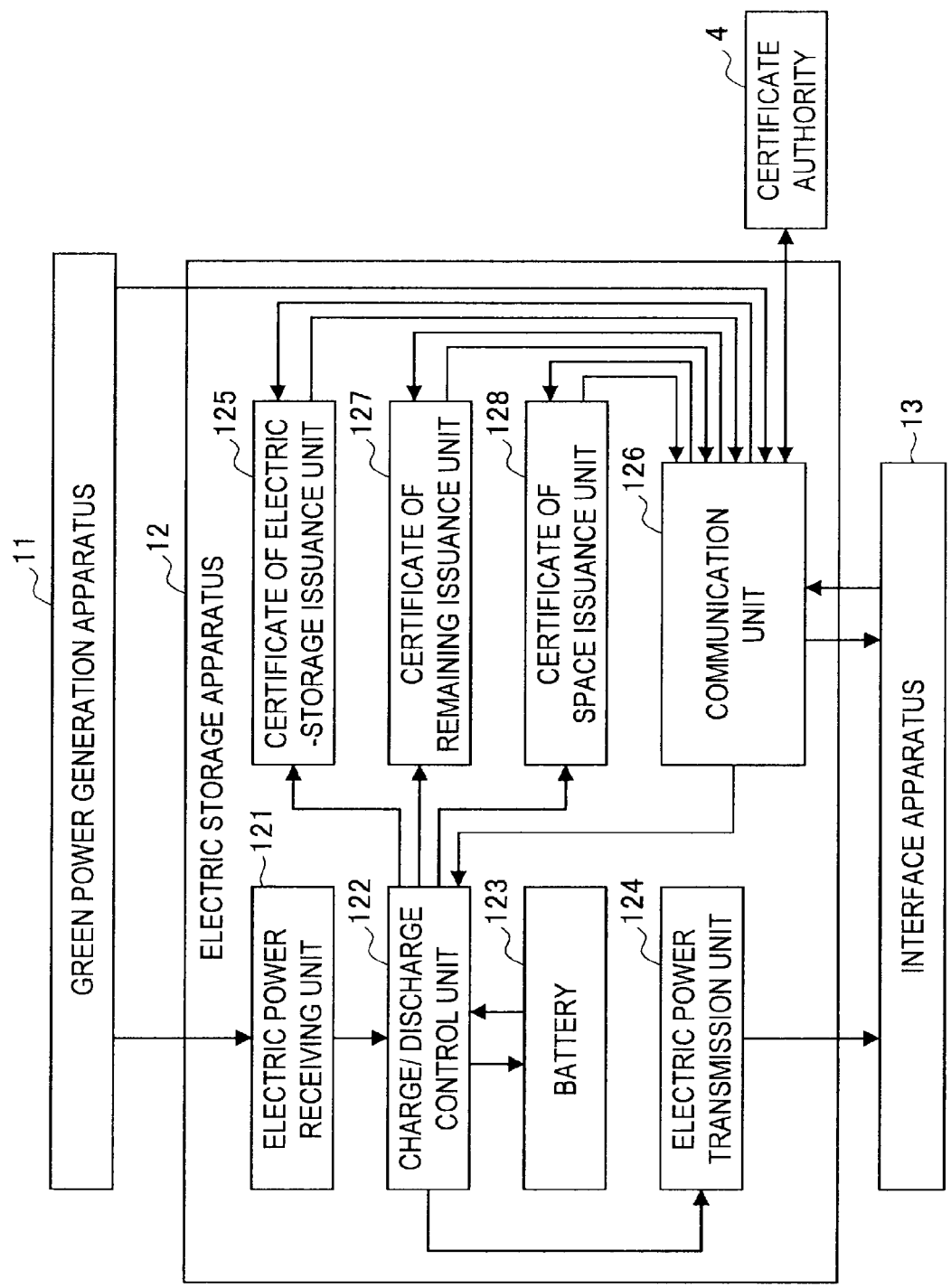
FIG. 8 is an explanatory diagram for illustrating a functional configuration of an electric storage apparatus according to the present embodiment.
Figure 9:
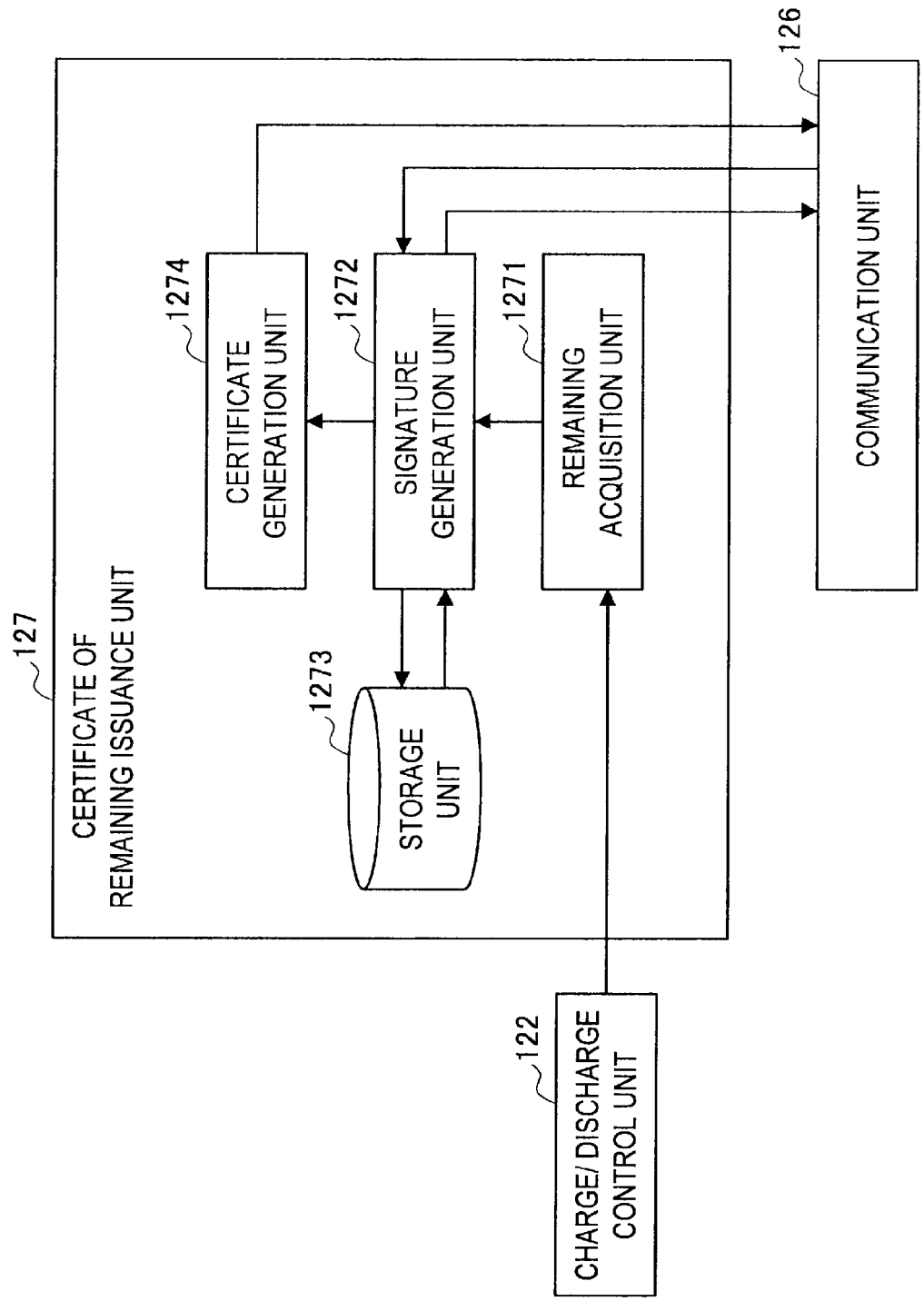
FIG. 9 is an explanatory diagram for illustrating a functional configuration of a certificate of remaining issuance unit according to the present embodiment.
Figure 10:
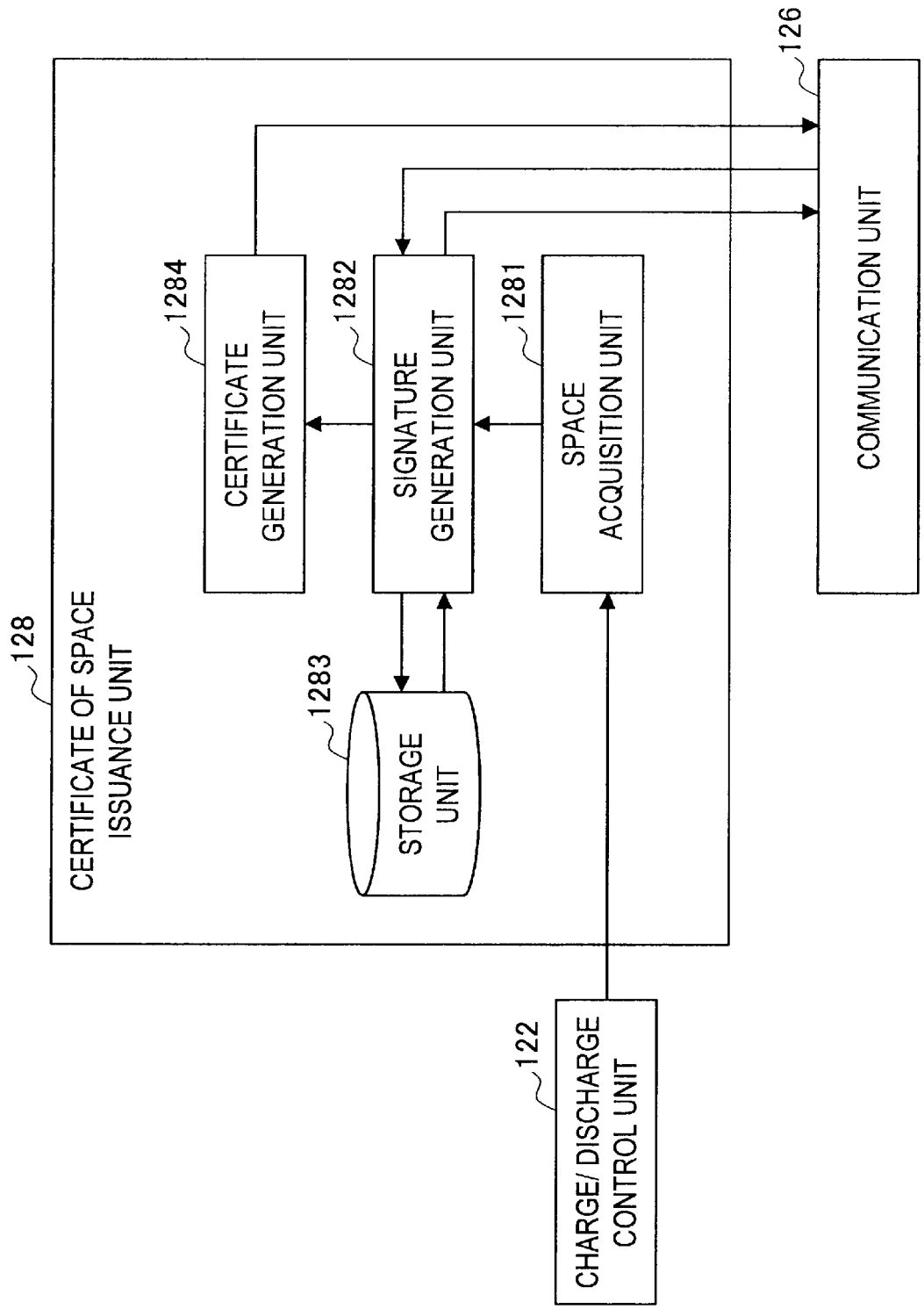
FIG. 10 is an explanatory diagram for illustrating a functional configuration of a certificate of space issuance unit according to the present embodiment.

Next, with reference to FIG. 7, an explanation will be given regarding a configuration of an energy trade system according to the second embodiment of the present invention. With reference to FIG. 8 through FIG. 10, an explanation will be given regarding a configuration of an electric storage apparatus 12 according to the present embodiment. Next, with reference to FIG. 11 and FIG. 12, an explanation will be given regarding a configuration of an interface apparatus 13 according to the present embodiment. Then, with reference to FIG. 13, an explanation will be given regarding an energy trade server 5 according to the present embodiment.

Figure 14:
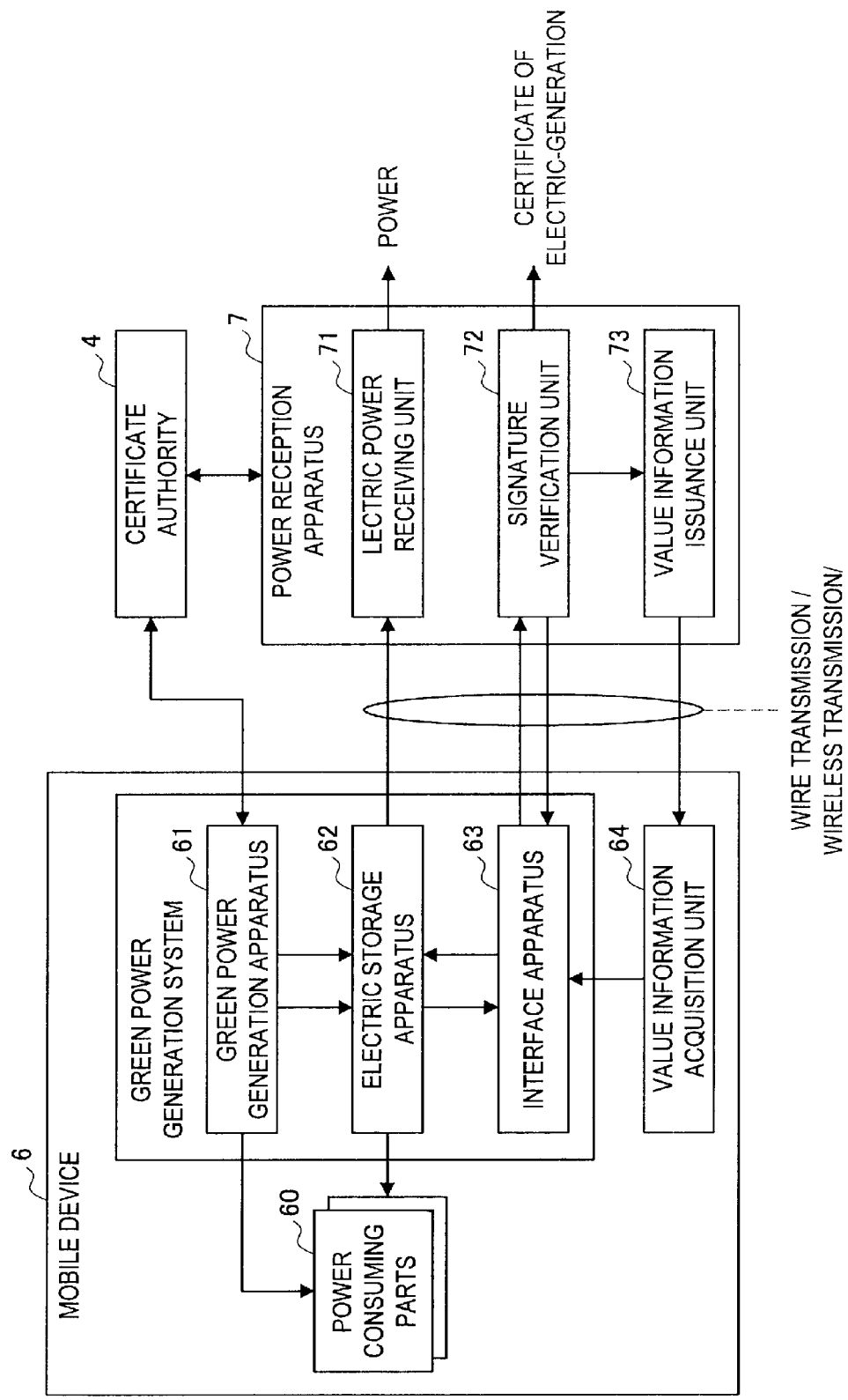
FIG. 14 is an explanatory diagram for illustrating a configuration of a green energy generation system according to the third embodiment of the present invention.
Figure 15:
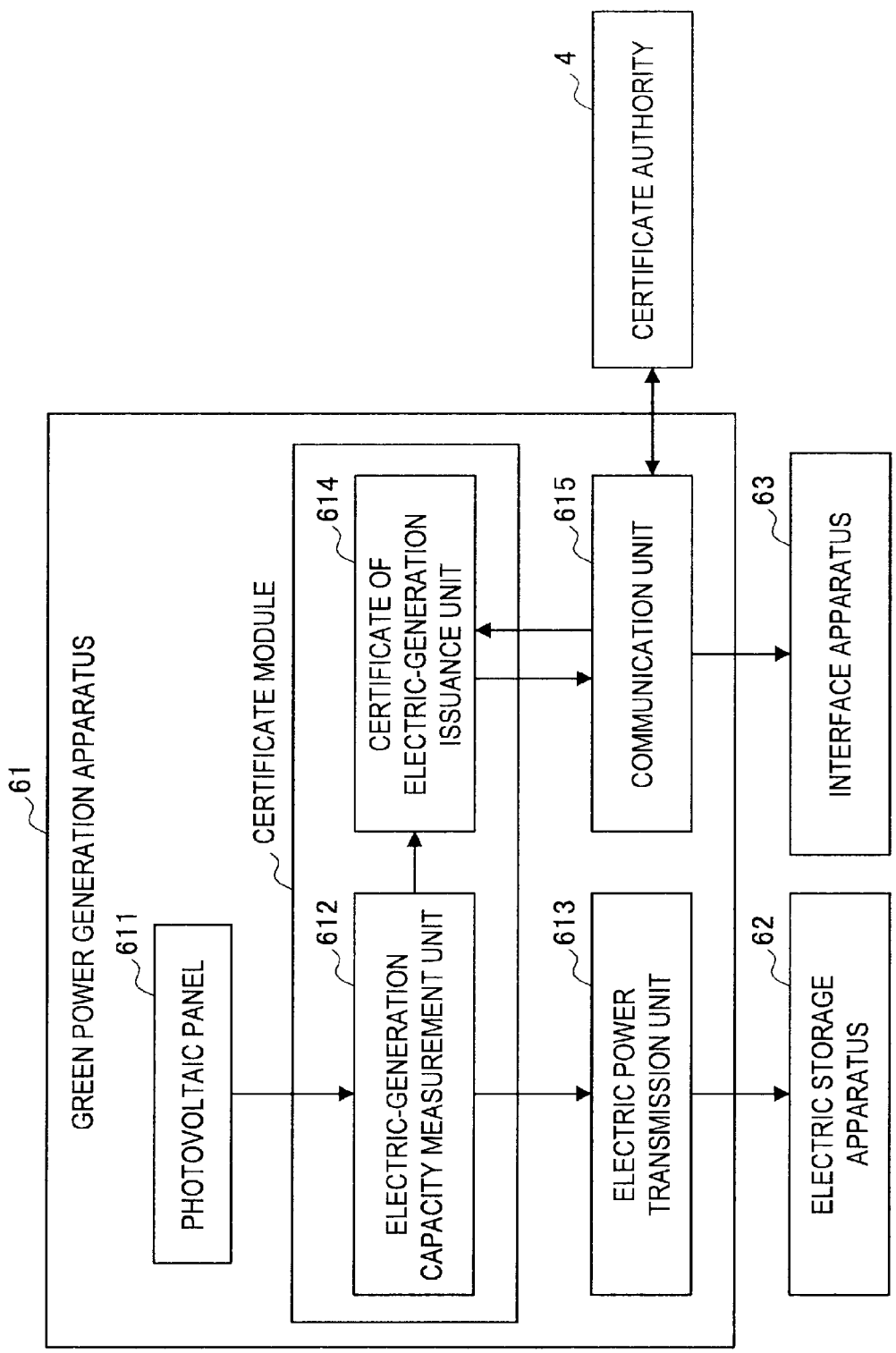
FIG. 15 is an explanatory diagram for illustrating a functional configuration of a green energy generation apparatus according to the present embodiment.
Figure 16:
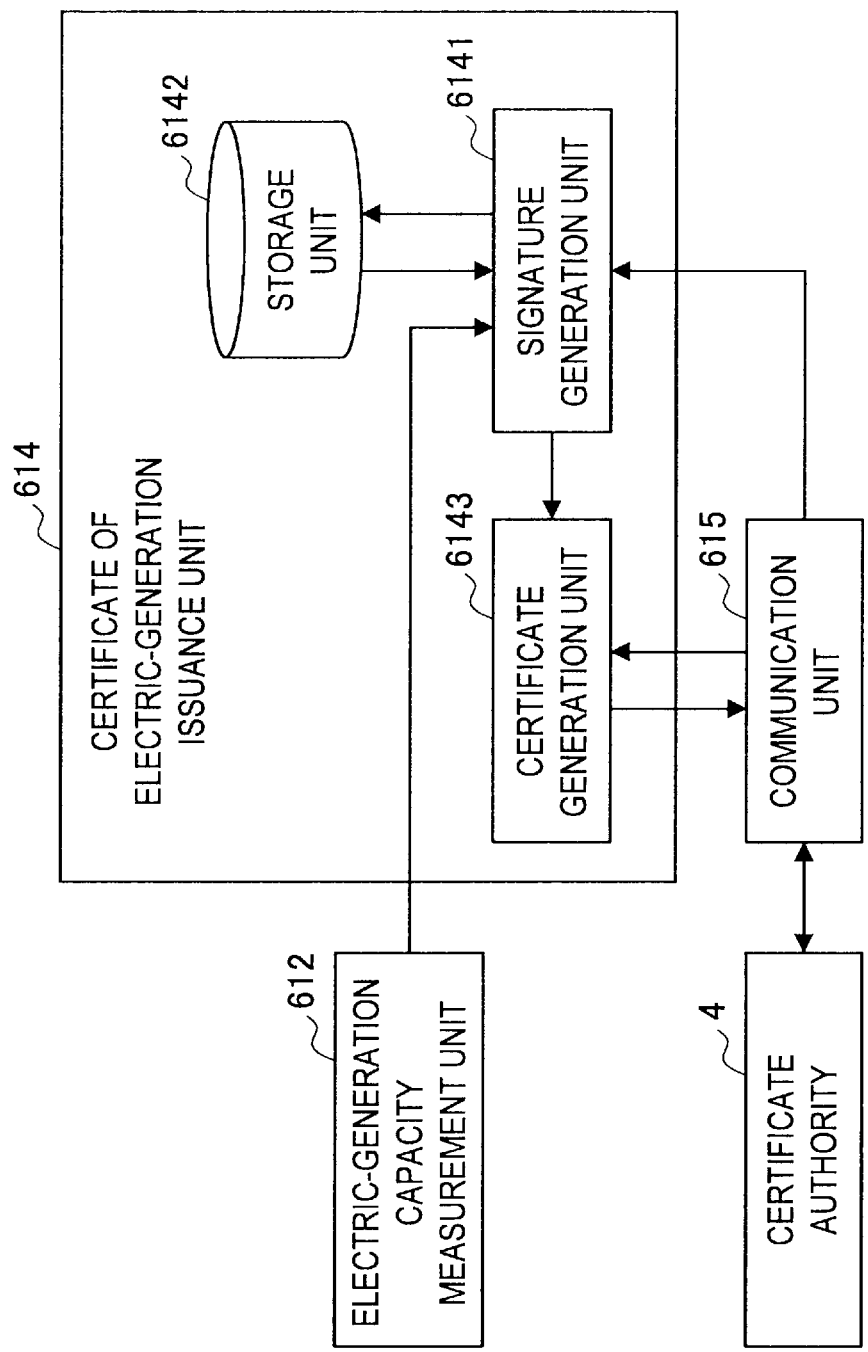
FIG. 16 is an explanatory diagram for illustrating a functional configuration of a certificate of electric-generation issuance unit according to the present embodiment.
Figure 17:
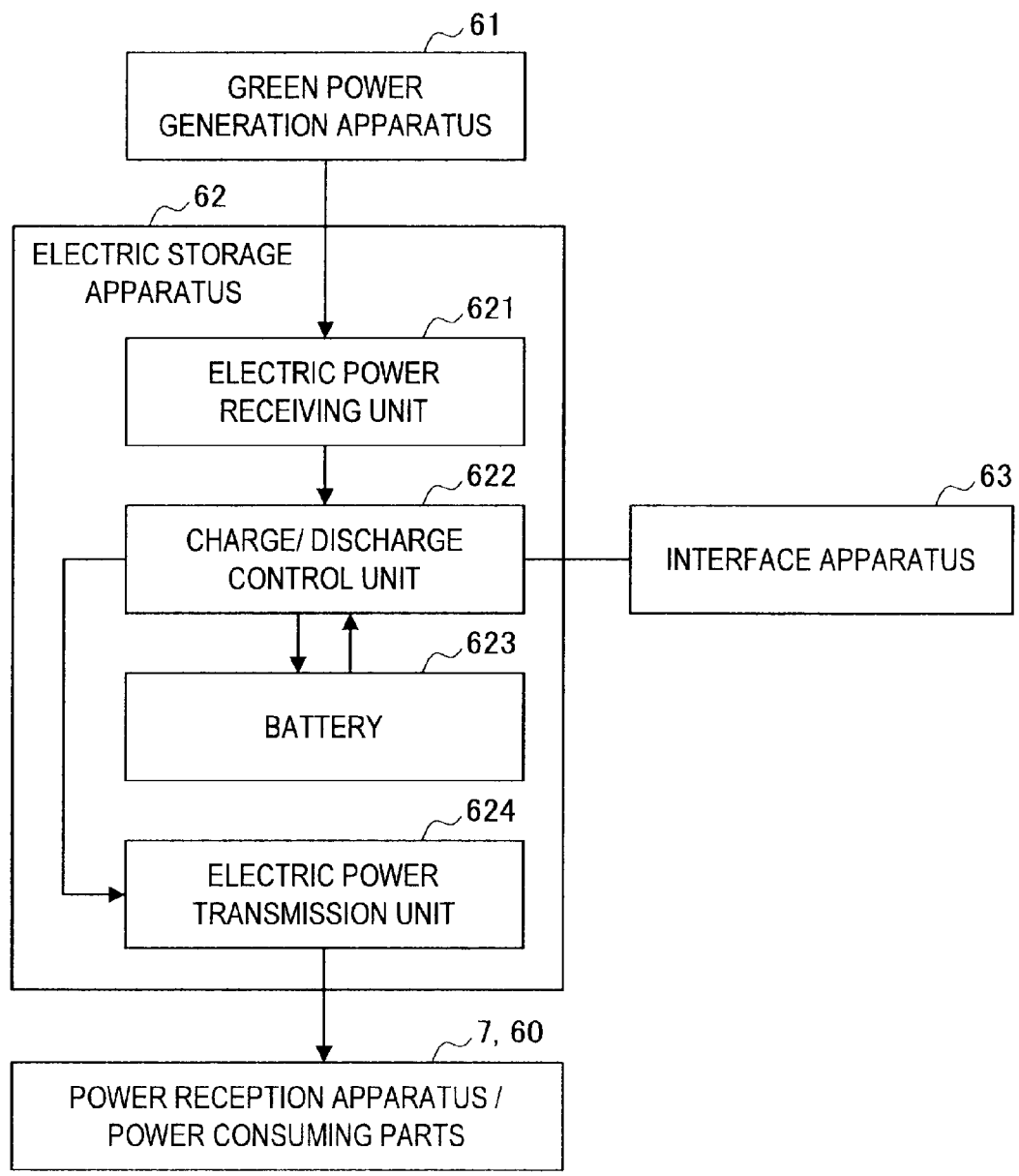
FIG. 17 is an explanatory diagram for illustrating a functional configuration of an electric storage apparatus according to the present embodiment.
Figure 18:
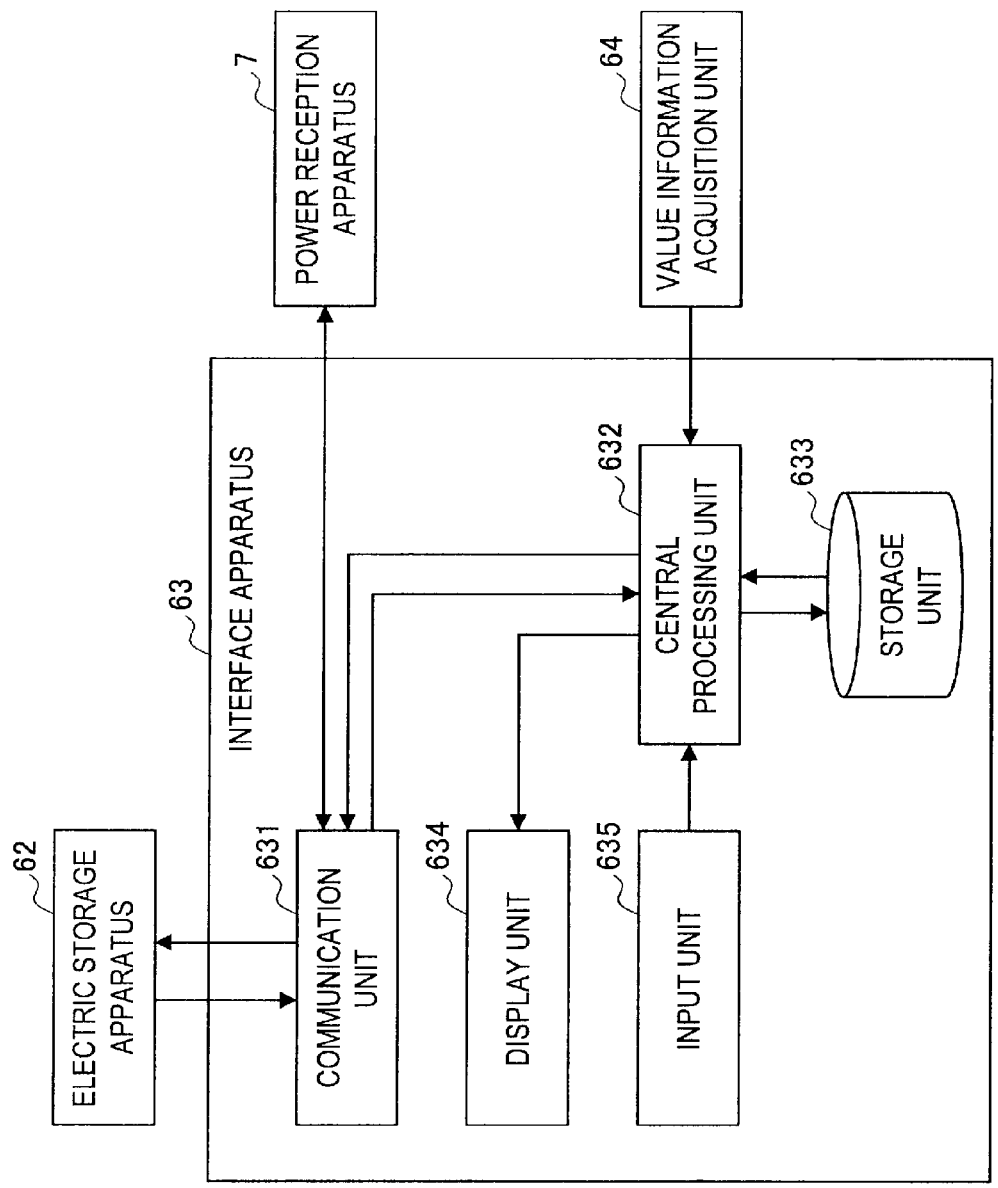
FIG. 18 is an explanatory diagram for illustrating a functional configuration of an interface apparatus according to the present embodiment.

With reference to FIG. 14, an explanation will be given regarding configurations of a mobile device 6 and an energy reception apparatus 7 according to the third embodiment of the present invention. With reference to FIG. 15 and FIG. 16, an explanation will be given regarding a green energy generation apparatus 61 according to the present embodiment. With reference to FIG. 17, an explanation will be given regarding a configuration of an electric storage apparatus 62 according to the present embodiment. With reference to FIG. 18, an explanation will be given regarding a configuration of an interface apparatus 63 according to the present embodiment. Next, with reference to FIG. 19 and FIG. 20, an explanation will be given regarding an operational method for transmitting electric energy according to the present embodiment.

Subsequently, an explanation will be given regarding an example of a hardware configuration capable of realizing functions of an interface apparatus, a mobile device, an energy trade server, or the like. Lastly, a technical philosophy of the embodiments will be described and a brief explanation will be given regarding functional effects derived from the technical philosophy.

(Description Items)

1: First Embodiment (Issuing a Green Certificate)
1-1: Configuration of Home Energy Network 1
1-2: Configuration of Green Energy Generation Apparatus 11
1-3: Configuration of Electric Storage Apparatus 12
1-4: Configuration of Interface Apparatus 13

2: Second Embodiment (Structure of Energy Trading Market for Individual Consumers)
   2-1: Configuration of Energy Trade System
   2-2: Configuration of Electric Storage Apparatus 12
   2-3: Configuration of Interface Apparatus 13
   2-4: Configuration of Energy Trade Server 5
3: Third Embodiment (Services based on a Green Certificate)
   3-1: Configuration of Mobile Device 6
   3-2: Configuration of Green Energy Generation Apparatus 61
   3-3: Configuration of Electric Storage Apparatus 62
   3-4: Configuration of Interface Apparatus 63
   3-5: Operation for Transmitting Electric Energy
4: Example of Hardware Configuration
5: Conclusion
1: First Embodiment (Issuing a Green Certificate)

Hereinafter, an explanation will be given regarding the first embodiment.

(1-1: Configuration of Home Energy Network 1)

At first, an explanation will be given regarding a configuration of a home energy network 1 according to the first embodiment with reference to FIG. 1. FIG. 1 is an explanatory diagram for illustrating a configuration of a green energy generation system according to the first embodiment. Note that the word "household" will be used so that a concrete configuration can be grasped easily, and the word "household" indicates a size that an individual electric energy consumer can handle by himself.

As shown in FIG. 1, the home energy network 1 includes an energy consuming device 10, a green energy generation apparatus 11, an electric storage apparatus 12, and an interface apparatus 13. The home energy network 1 is connected to a community energy network 2 and an electric utility company 3 via energy lines. Further, in this specification, the green energy generation apparatus 11, the electric storage apparatus 12, and the interface apparatus 13 may be collectively called a green energy generation apparatus.

The energy consuming device 10 is a device that consumes electric energy. For example, the energy consuming device 10 may be a home electric appliance, such as a refrigerator, a washing machine, an air conditioner, an electric fan, an electric heating appliance, a computer, a video receiver, a video recording/reproducing device, a music player, an audio recorder, a lighting equipment, an electric stove, a microwave oven, a dishwasher, a ventilating fan, a drier, an electric toothbrush, or the like.

The green energy generation apparatus 11 implements a method for generating electricity using renewable energy or environmentally friendly resources. For example, the green energy generation apparatus 11 may implement a method for generating electricity using solar energy, wind energy, geothermal energy, water energy, atomic energy, biomass fuel, hydrogen fuel, or the like. This specification, however, will focus on a photovoltaic energy generation method for convenience.

The electric storage apparatus 12 implements a method for charging electric energy. The electric storage apparatus 12 implements a method for charging electric energy using, for example, a lead-acid battery, a lithium ion secondary battery (Li-Ion battery), a sodium-sulfur battery (NaS battery), an electric double-layer capacitor, a pumped hydroelectric storage system, or the like. This specification, however, will focus on the lithium ion secondary battery for convenience.

The interface apparatus 13 implements a method for allowing an electric energy consumer (hereinafter, a user) to input information, or for displaying information to the user. Note that the interface apparatus 13 may be incorporated into the green energy generation apparatus 11, and the electric storage apparatus 12. Moreover, the green energy generation apparatus 11 and the electric storage apparatus 12 may be combined as a unit. Further, the green energy generation apparatus 11, the electric storage apparatus 12, and the interface apparatus 13 may be combined as a unit.

An example shown in FIG. 1 the energy consuming device 10 may operate upon a supply of electric energy directly from the green energy generation apparatus 11 or a supply of electric energy charged in the electric storage apparatus 12. Generally, electricity generated using renewable energy tends to be unstable. It is preferable for the energy consuming device 10 to utilize electric energy that has been charged once in the electric storage apparatus 12. For this reason, this specification will focus on an energy consuming device 10 that operates upon a supply of electricity charged in the electric storage apparatus 12.

The electricity generated by the green energy generation apparatus 11 is to be stored in the electric storage apparatus 12. The electric storage apparatus 12 can also store electricity supplied by the electric utility company 3. The electricity stored in the electric storage apparatus 12 is to be supplied to the energy consuming device 10, as described above. The electricity stored in the electric storage apparatus 12 is to be supplied to the community energy network 2 and the electric utility company 3. For example, surplus electricity generated by the green energy generation apparatus 11 that has not been consumed by the energy consuming device 10 is to be sold to the electric utility company 3. Such surplus electricity may be supplied to the community energy network 2 and may be sold to other users who form the community energy network 2.

When the user has bought electricity from another user who forms the community energy network 2, the electricity bought is to be stored in the electric storage apparatus 12. The community energy network 2 is a kind of electric energy community that is formed by connecting a plurality of the home energy networks 1 to the energy network 20. Note that the term "community" herein does not necessarily mean divisions, such as prefectures, municipalities, or the like, but a quantity of households being managed in the energy network 20. Needless to say, the community energy network 2 may be divided by prefectures, municipalities, administrative areas managed by a distinct electric utility company 3, or the like. Note that FIG. 1 shows a detailed configuration of home energy network 1 outside of the community energy network 2 for the sake of simplicity; however, this home energy network 1 is supposed to be included in the community energy network 2.

As described above, the electricity stored in the electric storage apparatus 12 will not only be consumed by the energy consuming device 10 that is included in the home energy network 1, but will also be supplied to the electric utility company 3 or the community energy network 2. Moreover, the electricity bought from another home energy network 1 in the community energy network 2, or the electric utility company 3, is to be stored in the electric storage apparatus 12. Thus, in the system according to the present embodiment, electricity is to be received/transmitted both outside and inside of the home energy network 1. User operations regarding such reception/transmission of electricity are performed via the interface apparatus 13. For example, an operation to buy electricity from the electric utility company 3 or another home energy network 1 is performed using the interface apparatus 13.

For this reason, the interface apparatus 13 is connected to another home energy network 1 or the electric utility company 3 via a communication network (not shown), and can exchange information with another home energy network 1 or the electric utility company 3. The interface apparatus 13 can acquire information on the amount of stored electricity or on the amount of space, or the like, from the electric storage apparatus 12, and can display the acquired information. The interface apparatus 13 can acquire information on electric-generation capacity from the green energy generation apparatus 11. Further, the interface apparatus 13 can acquire a later-described certificate of electric-generation from the green energy generation apparatus 11, and a later-described certificate of electric-storage from the electric storage apparatus 12.

The certificate of electric-generation recited above is a digital certificate that authenticates electricity generated by green energy generation. This certificate of electric-generation is issued by the green energy generation apparatus 11. The certificate of electric-storage is also a digital certificate that authenticates electricity generated by green energy generation, similar to the certificate of electric-generation. However, while the certificate of electric-generation is based on the electricity output from the green energy generation apparatus 11, the certificate of electric-storage is based on the electricity output from the electric storage apparatus 12. In other words, the certificate of electric-storage is based on the electricity generated by green energy generation modified by the electricity that has been lost through storage.

A digital certificate may include information, a digital signature based on the information, and/or a public key for verification of a digital signature. This public key is certified by a reliable certificate authority. In the example of FIG. 1, a certificate authority 4 corresponds to the certificate authority that certifies the public key. Further, the green energy generation apparatus 11 and the electric storage apparatus 12 are assumed to hold a private key and a public key generated in advance for issuance of the digital certificate. The public key is assumed to be certified by the certificate authority 4.

As described above, the green energy generation apparatus 11 holds the private key paired with the public key that is certified by the certificate authority 4. Utilizing this private key, the green energy generation apparatus 11 issues a certificate of electric-generation that authenticates information on electric-generation capacity when supplying the generated electricity to the electric storage apparatus 12. Specifically, the green energy generation apparatus 11 generates a digital signature based on the information on the electric-generation capacity by utilizing the private key, and generates a certificate of electric-generation with the addition of a digital signature to the information on the electric-generation capacity. Note that information on an area where the electricity has been generated (information that identifies the community energy network 2) may be added to the certificate of electric-generation.

The certificate of electric-generation issued by the green energy generation apparatus 11 is to be input into the electric storage apparatus 12. As described above, the electric storage apparatus 12 holds a private key paired with a public key that has been certified by the certificate authority 4, and the electric storage apparatus 12 uses this private key to issue a certificate of electric-storage. At first, the electric storage apparatus 12 acquires a public key certificate corresponding to the green energy generation apparatus 11 from the certificate authority 4, and verifies a digital signature contained in the certificate of electric-generation by using a public key contained in the public key certificate.

If successful in verifying the digital signature, the electric storage apparatus 12 multiplies electric-generation capacity contained in the certificate of electric-generation by storage efficiency to calculate electric-generation capacity modified based on electricity which has been lost through storage (hereinafter, referred to as modified electric-generation capacity). Subsequently, the electric storage apparatus 12 issues a certificate of electric-storage that authenticates information on the modified electric-generation capacity. Specifically, the electric storage apparatus 12 generates a digital signature based on the information on the modified electric-generation capacity by utilizing the private key, and generates a certificate of electric-storage with the addition of a digital signature to the information on the modified electric-generation capacity. Note that information on an area where the electricity has been generated (information that identifies the community energy network 2) may be added to the certificate of electric-storage.

The certificate of electric-storage issued as above is to be input into the interface apparatus 13. The interface apparatus 13 provides the certificate of electric-storage that has been input by the electric storage apparatus 12 to another home energy network 1 or electric utility company 3 when supplying electricity from the electric storage apparatus 12 to the other home energy network 1 or the electric utility company 3. By providing the certificate of electric-storage in this way, the interface apparatus 13 verifies that the electricity provided from the electric storage apparatus 12 is green energy.

Thus, the green energy generation system according to the present embodiment utilizes the certificate of electric-generation to provide a structure for verifying that the electricity generated by the green energy generation apparatus 11 is green energy. By using such a structure, when there is a gap between a green energy price and a standard energy price, for example, providing a certificate of electric-storage makes it possible to sell the electricity from the electric storage apparatus 12 at the green energy price.

Moreover, even in a case where the electricity generated by the green energy generation apparatus 11 has been consumed within the home energy network 1, a certificate of electric-generation remains if nothing else. The remaining certificate of electric-generation makes it possible to sell any arbitrary electricity bought from the electric utility company 3 at the green energy price. Thus, a benefit may be gained by generating green energy, whether or not the generated green energy is sold. Providing such a structure makes the monetary value of the green energy generation apparent, and it is expected that this would encourage the users to invest in equipment for green energy generation. Moreover, if the above structure is realized, the certificate of electric-generation itself gains monetary value and the certificate of electric-generation can be securitized.

Thus, to corporealize the value of green energy is extremely meaningful for the purpose of boosting the user's awareness of the green energy generation. If the value of green energy generation is widely-recognized, it accelerates the investment in equipment for green energy generation, and consequently, it will decrease the emission of greenhouse gases. Building a structure to combine the value of green energy and monetary value is expected to lead to the improvement of the world environment. The overall picture of the green energy generation system has been described hereto. A detailed configuration of the green energy generation system will be described later.

The configuration of the home energy network 1 according to the present embodiment has been explained as above.

(1-2: Configuration of Green Energy Generation Apparatus 11)

Figure 2:
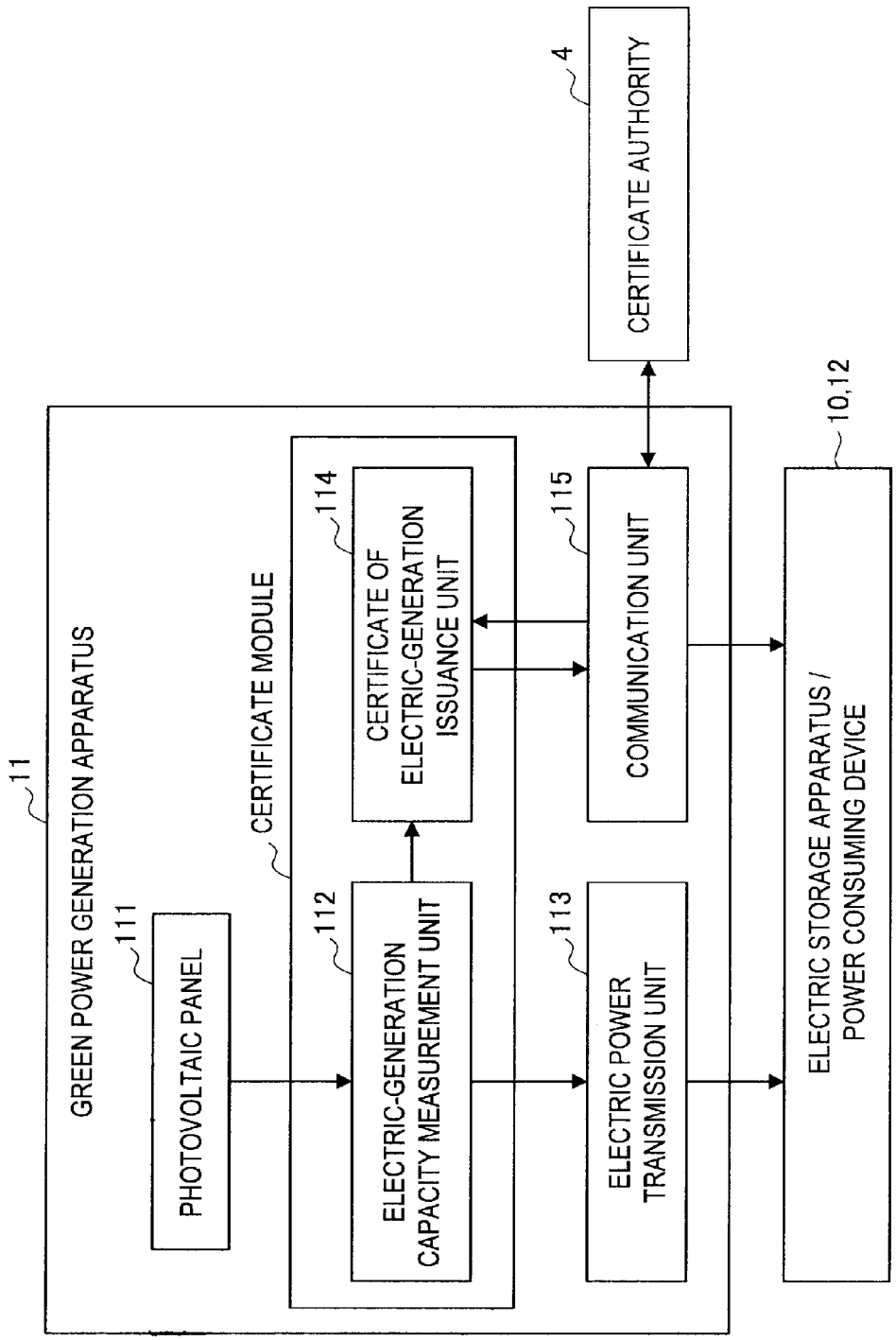
FIG. 2 is an explanatory diagram for illustrating a functional configuration of a green energy generation apparatus according to the present embodiment.
Figure 3:
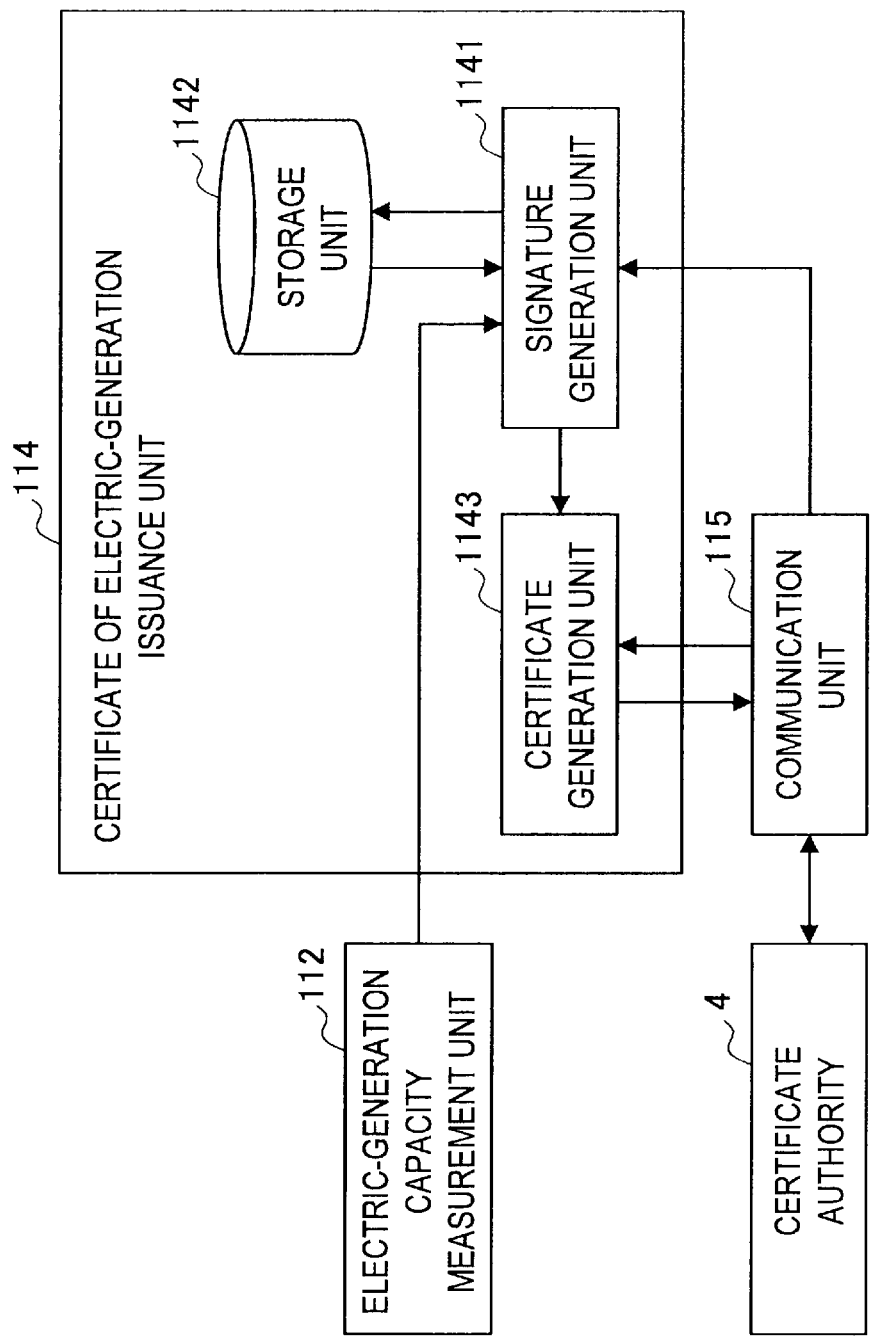
FIG. 3 is an explanatory diagram for illustrating a functional configuration of a certificate of electric-generation issuance unit according to the present embodiment.

With reference to FIG. 2 and FIG. 3, an explanation will be given regarding configurations of the green energy generation apparatus 11 according to the present embodiment. FIG. 2 is an explanatory diagram for illustrating a functional configuration of the green energy generation apparatus 11 according to the embodiment of the present invention. FIG. 3 is an explanatory diagram for illustrating a functional configuration of a certificate of electric-generation issuance unit 114 according to the embodiment of the present invention.

(Overall Configuration)

As shown in FIG. 2, the green energy generation apparatus 11 includes a photovoltaic panel 111, an electric-generation capacity measurement unit 112, an electric energy transmission unit 113, a certificate of electric-generation issuance unit 114, and a communication unit 115. Note that in the following description, the electric-generation capacity measurement unit 112 and the certificate of electric-generation issuance unit 114 may be collectively called a certificate module.

The electric-generation capacity measurement unit 112, certificate of electric-generation issuance unit 114, and communication unit 115 may be implemented as software modules. The green energy generation apparatus 11 may include one or more processors for executing the software modules to perform the functions thereof. Alternatively, the electric-generation capacity measurement unit 112, certificate of electric-generation issuance unit 114, and/or communication unit 115 may comprise one or more specialized hardware modules, such as integrated circuit modules.

The photovoltaic panel 111 implements a method for generating energy by converting the energy of solar light into electricity. The photovoltaic panel 111 utilizes, for example, silicon solar cells or dye-sensitized solar cells, or the like. The electricity generated by the photovoltaic panel 111 is to be input into the electric-generation capacity measurement unit 112. The electric-generation capacity measurement unit 112 measures the electric-generation capacity of the photovoltaic panel 111. Information on the electric-generation capacity measured by the electric-generation capacity measurement unit 112 is to be input into the certificate of electric-generation issuance unit 114.

The electricity generated by the photovoltaic panel 111 is to be input into the electric energy transmission unit 113 via the electric-generation capacity measurement unit 112. The electric energy transmission unit 113, to which the electricity generated by the photovoltaic panel 111 has been input, transmits the input electricity to the energy consuming device 10 or the electric storage apparatus 12. Note that in this description herein, the electricity input to the electric energy transmission unit 113 is to be transmitted to the electric storage apparatus 12.

The certificate of electric-generation issuance unit 114, to which the information on the electric-generation capacity has been input from the electric-generation capacity measurement unit 112, issues a certificate of electric-generation comprising the input information on the electric-generation capacity. Note that the detailed functional configuration of the certificate of electric-generation issuance unit 114 will be described later. The certificate of electric-generation that has been issued by the certificate of electric-generation issuance unit 114 is to be input into the communication unit 115. The communication unit 115, to which the certificate of electric-generation has been input, transmits the input certificate of electric-generation to the electric storage apparatus 12.

(Details of the Certificate of Electric-Generation Issuance Unit 114)

An explanation will be given regarding the detailed functional configuration of the certificate of electric-generation issuance unit 114. As shown in FIG. 3, the certificate of electric-generation issuance unit 114 includes a signature generation unit 1141, a storage unit 1142, and a certificate generation unit 1143. Note that the storage unit 1142 stores a private key and a corresponding public key, which have been generated in advance. Further, the public key stored in the storage unit 1142 is assumed to have been certified by the certificate authority 4.

The signature generation unit 1141, storage unit 1142, and certificate generation unit 1143 may be implemented as software modules. The green energy generation apparatus 11 or certificate of electric-generation issuance unit 114 may include one or more processors for executing the software modules to perform the functions thereof. Alternatively, the signature generation unit 1141, storage unit 1142, and/or certificate generation unit 1143 may comprise one or more specialized hardware modules, such as integrated circuit modules.

In the event when the information on the electric-generation capacity is input from the electric-generation capacity measurement unit 112 to the certificate of electric-generation issuance unit 114, the input information on the electric-generation capacity is to be input into the signature generation unit 1141. The signature generation unit 1141, to which the information on the electric-generation capacity has been input, acquires a private key from the storage unit 1142, and generates a digital signature based on the information on the electric-generation capacity using the private key that has been acquired. The digital signature generated by the signature generation unit 1141 is to be input into the certificate generation unit 1143 along with the information on the electric-generation capacity. The certificate generation unit 1143, to which the digital signature and the information on the electric-generation capacity have been input, generates a certificate of electric-generation containing the digital signature and the information on the electric-generation capacity which have been input. Subsequently, the certificate of electric-generation generated by the certificate generation unit 1143 is to be input into the communication unit 115.

(Content of a Certificate of Electric-Generation)

In this example, a certificate of electric-generation contains information on electric-generation capacity and a digital signature. By using this certificate of electric-generation, it is possible to authenticate the electric-generation capacity of the electricity that has been generated from green electric energy generation. However, there are some cases where it is desirable to add information regarding type of green energy generation and area of energy generation, or the like.

For example, when the energy price varies depending on the amount of emission of greenhouse gas generated at the time of energy generation, it is required to know the type of the green energy generation in order to determine the energy price for trading. In such a case, it is preferable to add information that indicates the type of the green energy generation (hereinafter, referred to as the electric energy generation method data) in the certificate of electric-generation. In the examples of FIG. 2 and FIG. 3, the electric energy generation method data that indicates photovoltaic generation is added to the certificate of electric-generation. In the case of a generation method utilizing renewable sources, the amount of emission of greenhouse gas is nearly zero; however, in the case of environmentally friendly energy generation, the emission amount of greenhouse gases varies depending on the fuel used for electric energy generation. In this case, types of fuels are to be indicated in the electric energy generation method data. It may be possible to develop a reference index indicating a degree of environmental load at the time of energy generation, and to add information indicating that reference index as the electric energy generation method data.

If (as a regional policy) it is expected to have a type of energy consumption that is locally produced and locally consumed, it is preferable to add information on area of generation (hereinafter, referred to as the area information) to a certificate of electric-generation. If the area of generation is away from the area of consumption geographically, it causes energy transmission loss when the electric energy is transmitted through energy transmission lines. Moreover, performing repeatedly DC/AC conversion and frequency conversion causes energy loss. For these reasons, in many cases, the type of energy consumption that is locally produced and consumed locally is desired. In the event of promoting such energy consumption type, generally a policy is applied so that the selling price of electricity locally produced and locally consumed is set high, and buying price of electricity locally produced and locally consumed is set low. Then, the certificate of electric-generation is expected to be added with the area information in order to authenticate that the electricity is locally produced and locally consumed. Information on a desired area of consumption may be added as the area information.

By adding such information to a certificate of electric-generation, the value of the certificate of electric-generation can be determined more precisely, and this contributes to the promotion of the green electric energy generation equipment having the best impact on the environment. It also contributes to the development of the regional policy and regional services, or to the formation of a trading market which is region-oriented. Note that it is desirable that various kinds of information added to the certificate of electric-generation be reliably authenticated with a digital signature, similar to the information on electric-generation capacity. In this case, the generation of the digital signature is performed by the signature generation unit 1141. Moreover, the generation of a certificate containing various kinds of information and the corresponding digital signature is performed by the certificate generation unit 1143.

The configuration of the green energy generation apparatus 11 according to the present embodiment has been explained above.

(1-3: Configuration of Electric Storage Apparatus 12)

Next, with reference to FIG. 4 and FIG. 5, the configuration of the electric storage apparatus 12 according to the present embodiment will be explained. FIG. 4 is an explanatory diagram for illustrating a functional configuration of the electric storage apparatus 12 according to the present embodiment. FIG. 5 is an explanatory diagram for illustrating a functional configuration of the certificate of electric-storage issuance unit 125 according to the present embodiment.

(Overall Configuration)

As shown in FIG. 4, the electric storage apparatus 12 includes an electric energy receiving unit 121, a charge/discharge control unit 122, a battery 123, an electric energy transmission unit 124, a certificate of electric-storage issuance unit 125, and a communication unit 126.

The certificate of electric-storage issuance unit 125 and communication unit 126 may be implemented as software modules. The electric storage apparatus 12 may include one or more processors for executing the software modules to perform the functions thereof. Alternatively, the certificate of electric-storage issuance unit 125 and/or communication unit 126 may comprise one or more specialized hardware modules, such as integrated circuit modules.

(At Receiving)

At first, the electricity supplied by the green energy generation apparatus 11 is to be received by the electric energy receiving unit 121. The electricity received by the electric energy receiving unit 121 is to be input into the charge/discharge control unit 122. The charge/discharge control unit 122, to which the electricity has been input by the electric energy receiving unit 121, inputs the input electricity to the battery 123 so as to charge the battery 123. At this time, the certificate of electric-storage issuance unit 125 receives a certificate of electric-generation from the green energy generation apparatus 11 via the communication unit 126. The certificate of electric-storage issuance unit 125, which has received the certificate of electric-generation, issues a certificate of electric-storage based on the received certificate of electric-generation and the storage efficiency of the battery 123. Note that the detailed description of the functional configuration of the certificate of electric-storage issuance unit 125 will be described later.

(At Transmitting)

If an instruction for discharging is received from the interface apparatus 13 via the communication unit 126, the instruction is to be input into the charge/discharge control unit 122 via the communication unit 126. The charge/discharge control unit 122, to which the instruction for discharging has been input, discharges from the battery 123 the amount of electricity based on the instruction. The electricity that has been discharged from the battery 123 by the charge/discharge control unit 122 is to be input into the electric energy transmission unit 124, and is to be transmitted to the energy consuming device 10, the community energy network 2, or the electric utility company 3 from the electric energy transmission unit 124. In this example, however, it is assumed to be transmitted to the electric utility company 3. At this time, the charge/discharge control unit 122 inputs information on the amount of discharged electricity into the certificate of electric-storage issuance unit 125.

The certificate of electric-storage issuance unit 125, to which the information on the amount of discharged electricity has been input, based on the input information on the amount of discharged electricity, generates a certificate of electric-storage that authenticates the amount of discharged electricity generated from green energy generation. If it is possible to use a certificate of electric-storage issued at the time of receiving the electricity from the green energy generation apparatus 11, the certificate of electric-storage will be used. In this example, however, it is assumed that the certificate of electric-storage issuance unit 125 issues a certificate of electric-storage corresponding to the amount of the discharged electricity. The certificate of electric-storage issuance unit 125, which has issued the certificate of electric-storage corresponding to the amount of discharged electricity, transmits the certificate of electric-storage to the interface apparatus 13 via the communication unit 126.

(Detail Description of the Certificate of Electric-Storage Issuance Unit 125)

The detailed functional configuration of the certificate of electric-storage issuance unit 125 will be explained. As shown in FIG. 5, the certificate of electric-storage issuance unit 125 includes a signature verification unit 1251, an electric-generation capacity modification unit 1252, a signature generation unit 1253, a storage unit 1254, and a certificate generation unit 1255. Note that the storage unit 1254 stores a private key and a corresponding public key which have been generated in advance. Further, the public key stored in the storage unit 1254 is assumed to have been certified by the certificate authority 4.

The signature verification unit 1251, electric-generation capacity modification unit 1252, signature generation unit 1253, storage unit 1254, and certificate generation unit 1255 may be implemented as software modules. The electric storage apparatus 12 or the certificate of electric-storage issuance unit 125 may include one or more processors for executing the software modules to perform the functions thereof. Alternatively, the signature verification unit 1251, electric-generation capacity modification unit 1252, signature generation unit 1253, storage unit 1254, and/or certificate generation unit 1255 may comprise one or more specialized hardware modules, such as integrated circuit modules.

(At Receiving)

At first, the certificate of electric-generation received by the certificate of electric-storage issuance unit 125 via the communication unit 126 is to be input into the signature verification unit 1251. The signature verification unit 1251, to which the certificate of electric-generation has been input, acquires a public key certificate corresponding to the green energy generation apparatus 11 from the certificate authority 4 via the communication unit 126. Then, the signature verification unit 1251 uses the public key contained in the public key certificate to verify the validity of the digital signature contained in the certificate of electric-generation. If successful in the verification of the digital signature, the signature verification unit 1251 inputs the information on the electric-generation capacity contained in the certificate of electric-generation into the electric-generation capacity modification unit 1252.

If area information or the like is added to the certificate of electric-generation, the signature verification unit 1251 verifies the digital signature in the same way, and if successful, the signature verification unit 1251 inputs the area information or the like into the certificate generation unit 1255. In this example, however, it is assumed that only information on the electric-generation capacity is contained in the certificate of electric-generation.

The electric-generation capacity modification unit 1252, to which the information on the electric-generation capacity has been input by the signature verification unit 1251, acquires information that indicates the charge efficiency of the battery 123 from the charge/discharge control unit 122. Then, the electric-generation capacity modification unit 1252 multiplies the electric-generation capacity by the charge efficiency of the battery 123 to calculate the modified electric-generation capacity, adjusted based on the loss of electricity in the battery 123. Note that if the electric-generation capacity indicated by the certificate of electric-generation is used as it is, the value of the electricity lost in the battery 123 (the electricity lost without being consumed) remains unaccounted. For this reason, the electric-generation capacity is to be modified by the electric-generation capacity modification unit 1252.

The information on the modified electric-generation capacity calculated by the electric-generation capacity modification unit 1252 is to be input into the signature generation unit 1253. The signature generation unit 1253, to which the information on the modified electric-generation capacity has been input, acquires a private key from the storage unit 1254, and generates a digital signature based on the information on the modified electric-generation capacity using the private key that has been acquired. The digital signature generated by the signature generation unit 1253 is to be input into the certificate generation unit 1255 along with the information on the modified electric-generation capacity. The certificate generation unit 1255, to which the digital signature and the information on the modified electric-generation capacity have been input, generates a certificate of electric-storage containing the digital signature and the information on the modified electric-generation capacity which have been input.

Note that if area information or the like is contained in the certificate of electric-generation, the signature generation unit 1253 generates a digital signature for the area information or the like, and the certificate generation unit 1255 generates a certificate of electric-storage containing area information or the like. Note that the certificate generation unit 1255 may include the area information or the like that is contained in the certificate of electric-generation in the certificate of electric-storage as it is.

(At Transmitting)

If the electric storage apparatus 12 receives a discharge instruction from the interface apparatus 13 via the communication unit 126, information on the amount of discharged electricity is input to the certificate of electric-storage issuance unit 125. The information on the amount of discharged electricity that has been input into the certificate of electric-storage issuance unit 125 is to be input into the certificate generation unit 1255. The certificate generation unit 1255, to which the information on the amount of discharged electricity has been input, generates a certificate of electric-storage corresponding to the amount of discharged electricity to transmit to the discharging destination (the electric utility company 3 in this example) via the communication unit 126. Note that there are two methods for generating the certificate of electric-generation corresponding to the amount of discharged electricity as follows.

The first method generates a plurality of certificates of electric-storage corresponding to a prescribed amount of electricity (modified electric-generation capacity) per unit at the time of receiving the electricity. In other words, when receiving one certificate of electric-generation corresponding to a certain amount of electric-generation capacity, this method does not generate only one certificate of electric-storage corresponding to the modified electric-generation capacity. Rather, the necessary amount of certificates of electric-storage are generated in accordance with the prescribed amount of electricity per unit. Therefore, if this method is applied, at the time of receiving the electricity, as many as (the modified electric-generation capacity/the amount of electricity per unit) certificates of electric-storage will be generated. If certificates of electric-storage are generated piece by piece for each unit of electricity and are stored in the storage unit 1254, the number of certificates of electric-storage provided at the time of discharging electricity corresponds to the amount of discharged electricity output to the discharging destination.

The second method generates one certificate of electric-storage corresponding to the amount of discharged electricity at the time of discharging electricity. Upon receiving one certificate of electric-generation corresponding to a certain amount of electric-generation capacity, this method generates one certificate of electric-storage corresponding to the modified electric-generation capacity, and stores the certificate of electric-storage in the storage unit 1254. At the time of discharging electricity, the certificate of electric-storage stored in the storage unit 1254 is read out, the modified electric-generation capacity is divided into the first modified electric-generation capacity, which equals the amount of discharged electricity, and the second modified electric-generation capacity, which is calculated by subtracting the first modified electric-generation capacity from the original modified electric-generation capacity, and certificates of electric-storage corresponding to each of the first and the second modified electric-generation capacities are generated. Subsequently, the certificate of electric-storage for the first modified electric-generation capacity will be provided to the discharging destination, while the certificate of electric-storage for the second modified electric-generation capacity will be stored in the storage unit 1254.

Using either method, a certificate of electric-storage corresponding to the amount of discharged electricity will be acquired and the certificate of electric-storage will be provided to the discharging destination via the communication unit 126. It is not necessary to recreate the certificates of electric-storage when using the first method described above; however, when using the second method described above, it is necessary to recreate the certificates of electric-storage (creating the first and the second certificates of electric-storage). In this case, a process to recreate the certificate of electric-storage will be performed by the signature generation unit 1253 and the certificate generation unit 1255, similar to the process of creating the certificate of electric-storage performed at the time of receiving electricity. Note that the two methods described herein are examples and other methods may be applied to create certificates of electric-storage corresponding to the amount of discharged electricity. In this specification, it is assumed that certificates of electric-storage corresponding to the amount of discharged electricity are generated by the second method.

The configuration of the electric storage apparatus 12 according to the present embodiment has been explained as above.

(1-4: Configuration of Interface Apparatus 13)

Figure 6:
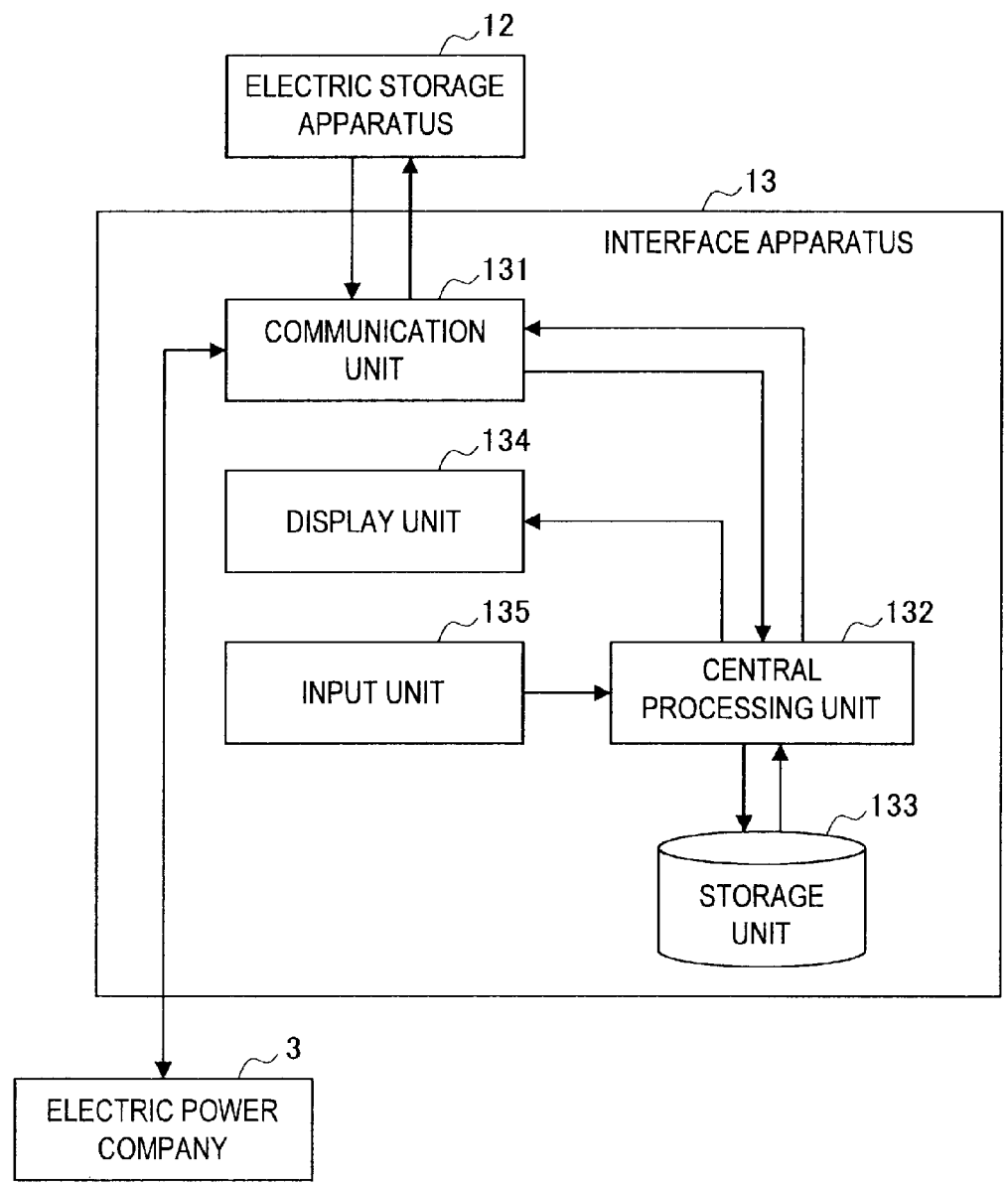
FIG. 6 is an explanatory diagram for illustrating a functional configuration of an interface apparatus according to the present embodiment.

With reference to FIG. 6, the configuration of the interface apparatus 13 according to the present embodiment will be explained. FIG. 6 is an explanatory diagram for illustrating a functional configuration of an interface apparatus according to the embodiment of the present invention.

As shown in FIG. 6, the interface apparatus 13 includes a communication unit 131, a central processing unit 132, a storage unit 133, a display unit 134 and an input unit 135.

When the electricity is discharged from the electric storage apparatus 12, a user inputs information on the amount of discharged electricity or the like using the input unit 135. The information that has been input using the input unit 135 is to be input into the electric storage apparatus 12 via the central processing unit 132 and the communication unit 131. When the process of discharging electricity is performed by the electric storage apparatus 12, the communication unit 131 receives a certificate of electric-storage. The certificate of electric-storage received by the communication unit 131 is to be input into the central processing unit 132. The central processing unit 132, to which the certificate of electric-storage has been input, transmits the input certificate of electric-storage to a discharging destination (the electric utility company 3 in this example) via the communication unit 131.

Note that the interface apparatus 13 allows the user to input or display information when the user buys or sells the electricity. The process for realizing such functions is performed by the central processing unit 132. For example, the central processing unit 132 acquires information on the buying price of electricity and the selling price of electricity from the electric utility company 3 or the like via the communication unit 131, and displays the information on the display unit 134. Moreover, the central processing unit 132 inputs the information on the amount of electricity to buy or the amount of electricity to sell, which has been input using the input unit 135, into the display unit 134, or transmits the information to the electric utility company 3 or the like via the communication unit 131.

Further, when the user inputs an instruction to sell electricity using the input unit 135, the central processing unit 132 transmits an instruction to discharge electricity and information on the amount of electricity to the electric storage apparatus 12 via the communication unit 131. Note that the storage unit 133 is used to store information received from the electric storage apparatus 12 or the electric utility company 3, or information that a user has input, or used to store a public key or the like corresponding to the green energy generation apparatus 11 or the electric storage apparatus 12 as needed. The storage unit 133 is used to store a program that defines operations of the central processing unit 132.

The configuration of the interface apparatus 13 according to the present embodiment has been explained as above.

2: Second Embodiment (Structure of Energy Trading Market for Individual Consumer)

Hereinafter, a second embodiment will be explained. Note that structural elements with functions and structures that are substantially the same as those of the structural elements according to the first embodiment described above are denoted with the same reference numerals, and repeated explanation of these structural elements is omitted.

(2-1: Configuration of Energy Trade System)

First, with reference to FIG. 7, the configuration of the energy trade system according to the present embodiment will be explained. FIG. 7 is an explanatory diagram for illustrating a functional configuration of an energy trade server according to the embodiment. Note that the word "household" will be used, as in the description of the first embodiment, so that a concrete configuration can be grasped easily, and w the word "household" herein indicates a size that an individual electric utility consumer can handle by himself.

Figure 7:
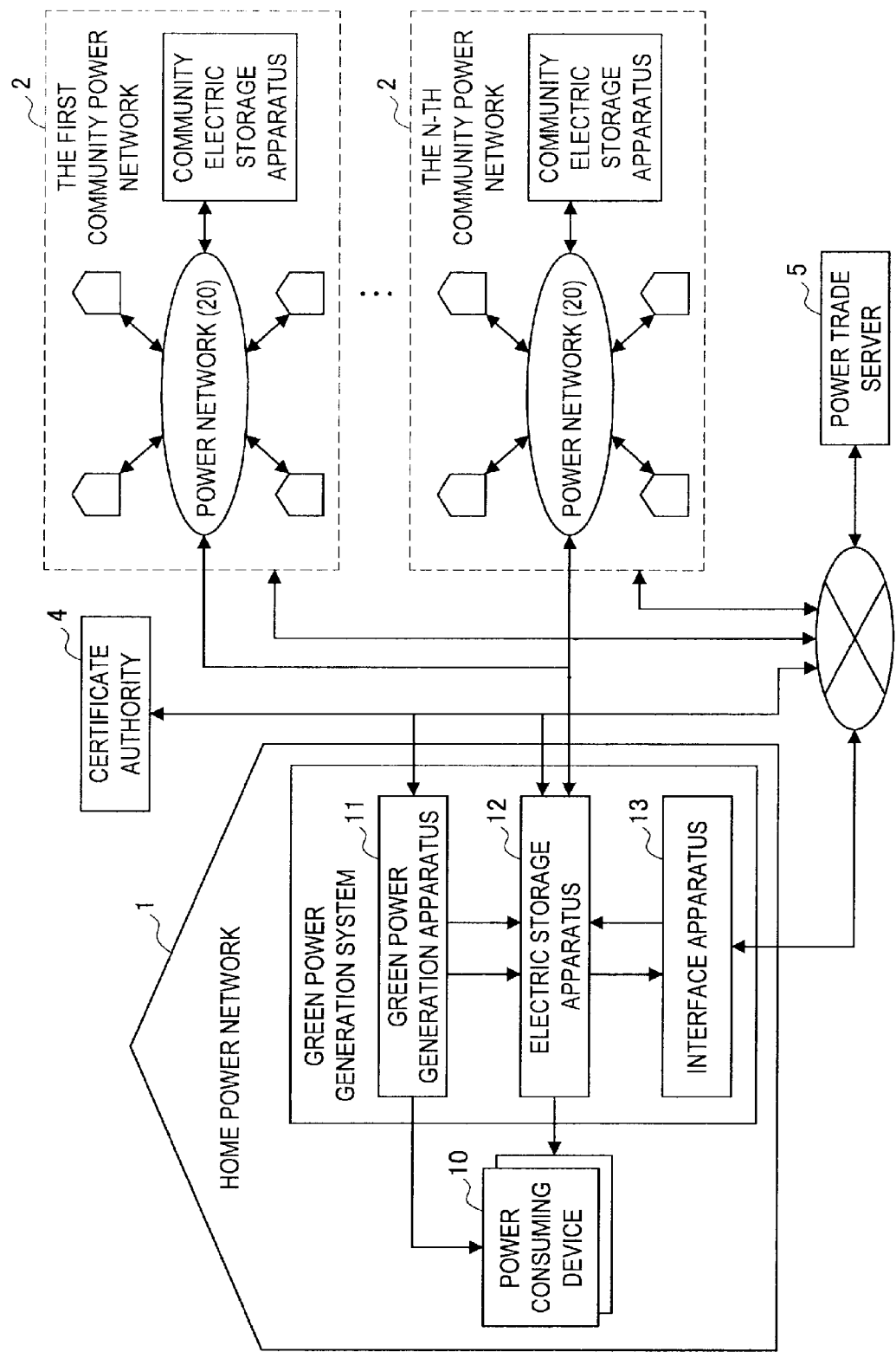
FIG. 7 is an explanatory diagram for illustrating a configuration of a green energy generation system consistent with a second embodiment of the present invention.

As shown in FIG. 7, the energy trade system according to the present embodiment includes a home energy network 1, a plurality of community energy networks 2 (the first community energy network to the N-th community energy network), a certificate authority 4 and an energy trade server 5. Note that an electric utility company 3 may be included, similar to FIG. 1. Moreover, the home energy network 1 includes the energy consuming device 10, the green energy generation apparatus 11, the electric storage apparatus 12 and the interface apparatus 13. The home energy network 1 is assumed to be connected to a plurality of the community energy networks 2 (the first community energy network to the N-th community energy network) via energy lines.

The major difference between FIG. 1 and FIG. 7 is the existence of the energy trade server 5. As described in the above explanation of the first embodiment, there is a price gap between ordinary electric energy, which has been produced using fossil fuels or the like, and green energy, and if a structure is developed in which the electricity can be traded at the price of green energy by adding a certificate of electric-generation or a certificate of electric-storage to a certain electric energy, the certificate of electric-generation and the certificate of electric-storage will have monetary value. Further, it will be possible to develop a market where the certificate of electric-generation or the certificate of electric-storage itself can be traded independently after being securitized.

The energy trade server 5 described above is a server apparatus for managing energy trade, such as the one described above, and for managing trade of the certificate of electric-generation or the certificate of electric-storage, or the like. The present embodiment relates to a method for managing such energy trade, and trade of the certificate of electric-generation or the certificate of electric-storage, or the like. Hereinafter, functions of the electric storage apparatus 12 added to the configuration of the first embodiment described above, functions of the interface apparatus 13, and functions of the energy trade server 5, which realize management of the e trade according to the present embodiment, will be explained one by one.

Although the certificate of electric-generation and the certificate of electric-storage differ as to whether electricity loss occurring at the time of storage has been taken into consideration, they are substantially identical in that they are both digital certificates that authenticate green energy. When the loss at the time of storage is small enough to be negligible, the certificate of electric-generation and the certificate of electric-storage become the same. For this reason, in the following description, it is assumed that the certificate of electric-storage will be used for energy trade.

The configuration of the energy trade according to the present embodiment has been explained above.

(2-2: Configuration of Electric Storage Apparatus 12)

With reference to FIG. 8 through FIG. 10, the configuration of the electric storage apparatus 12 according to the present embodiment will be explained. FIG. 8 is an explanatory diagram for illustrating a functional configuration of the electric storage apparatus 12 according to the present embodiment. FIG. 9 is an explanatory diagram for illustrating a functional configuration of a certificate of remaining issuance unit 127 according to the present embodiment. FIG. 10 is an explanatory diagram for illustrating a functional configuration of a certificate of space issuance unit 128 according to the present embodiment.

As shown in FIG. 8, the electric storage apparatus 12 includes the electric energy receiving unit 121, the charge/discharge control unit 122, the battery 123, the electric energy transmission unit 124, the certificate of electric-storage issuance unit 125, the communication unit 126, the certificate of remaining issuance unit 127 and the certificate of space issuance unit 128. Note that functions of the electric energy receiving unit 121, the charge/discharge control unit 122, the battery 123, the electric energy transmission unit 124, the certificate of electric-storage issuance unit 125, and the communication unit 126 are the same as the electric storage apparatus 12 according to the first embodiment described above; therefore, detailed explanation regarding these structural elements will be omitted and an explanation will be given regarding the certificate of remaining issuance unit 127 and the certificate of space issuance unit 128 only.

The certificate of electric-storage issuance unit 125, communication unit 126, certificate of remaining issuance unit 127, and certificate of space issuance unit 128 may be implemented as software modules. The electric storage apparatus 12 may include one or more processors for executing the software modules to perform the functions thereof. Alternatively, the certificate of electric-storage issuance unit 125, communication unit 126, certificate of remaining issuance unit 127, and/or certificate of space issuance unit 128 may comprise one or more specialized hardware modules, such as integrated circuit modules.

(Introduction)

In addition to energy, there exist various types of commodities being traded in the world. For example, various financial commodities are circulating in the market, such as interest, currency, loan receivable, securities, or the like. Moreover, derivatives, such as futures, swaps, options, or the like are also widely utilized. For example, futures are contracts to trade cash commodities on a future date at a currently specified price. The cash commodities include various types of commodities, such as oil, energy, emission credit, wheat, soybeans, corn, or the like.

Originally, futures used to be executed on a due date being associated with delivery and receipt of the cash commodities. Today, however, transactions involving futures generally do not require actual commodities to be delivered or received, and the offsetting transaction is executed by the due date for offsetting. For this reason, transaction prices of cash commodities often move up and down rapidly due to speculative transactions.

However, the energy trading market assumed in the present embodiment is a market individual electric utility consumers join based on the assumption that cash commodities are to be delivered and received. Therefore, it is strongly desired to eliminate risks, such as a gyrating market price caused by those speculative transactions, or sagging energy supply on the delivery date. To eliminate such risks, it is necessary to exclude players who repeatedly sell and buy in a period of time shorter than the necessary time for the delivery of commodities, to exclude players who do not own any cash commodities to be delivered, or to exclude players who have difficulty receiving cash commodities.

Although futures have been described as an example here, the present embodiment is directed to a real-time energy trade. Therefore, it is preferable that the energy trade server 5 manages information in real time, the information including, for example, whether a player who has placed a sell order currently has enough remaining battery level to deliver, or whether a player who has placed a buy order has enough battery space to receive. However, as the number of players increases, it will be difficult for the energy trade server to determine each player's remaining battery level and battery space in real time. The present embodiment resolves such issues.

(Functions of the Certificate of Remaining Issuance Unit 127)

The energy trade system according to the present embodiment utilizes a certificate of remaining that authenticates remaining battery level in order to verify the remaining battery level of a player who has placed a sell order. This certificate of remaining is issued by the certificate of remaining issuance unit 127 of the electric storage apparatus 12.

As shown in FIG. 9, the certificate of remaining issuance unit 127 includes a remaining acquisition unit 1271, a signature generation unit 1272, a storage unit 1273 and a certificate generation unit 1274. Note that the storage unit 1273 stores a private key and a corresponding public key which have been generated in advance. Further, the public key stored in the storage unit 1273 is assumed to have been certified by the certificate authority 4.

The remaining acquisition unit 1271, signature generation unit 1272, storage unit 1273, and certificate generation unit 1274 may be implemented as software modules. The electric storage apparatus 12 or the certificate of remaining issuance unit 127 may include one or more processors for executing the software modules to perform the functions thereof. Alternatively, the remaining acquisition unit 1271, signature generation unit 1272, storage unit 1273, and/or certificate generation unit 1274 may comprise one or more specialized hardware modules, such as integrated circuit modules.

If a user places a sell order using the interface apparatus 13, a notification indicating the sell order is to be input into the charge/discharge control unit 122 via the communication unit 126. The charge/discharge control unit 122 receiving this notification detects remaining battery level of the battery 123, and inputs information on the detected remaining battery level into the certificate of remaining issuance unit 127. The information on the remaining battery level, which has been input into the certificate of remaining issuance unit 127, will be acquired by the remaining acquisition unit 1271. And the information on the remaining battery level acquired by the remaining acquisition unit 1271 is to be input into the signature generation unit 1272.

The signature generation unit 1272, to which the information on the remaining battery level has been input, acquires a private key from the storage unit 1273, and generates a digital signature based on the information on the remaining battery level using the private key that has been acquired. The digital signature generated by the signature generation unit 1272 is to be input into the certificate generation unit 1274 along with the information on the remaining battery level. The certificate generation unit 1274, to which the digital signature and the information on the remaining battery level have been input, generates a certificate of remaining containing the digital signature and the information on the remaining battery level which have been input. Subsequently, the certificate of remaining generated by the certificate generation unit 1274 is to be input into the communication unit 126. This certificate of remaining is to be transmitted to the interface apparatus 13 via the communication unit 126, and to the energy trade server 5 via the interface apparatus 13.

(Functions of the Certificate of Space Issuance Unit 128)

The energy trade system according to the present embodiment utilizes a certificate of space that authenticates battery space in order to verify the battery space of a player who has placed a buy order. This certificate of space is issued by the certificate of space issuance unit 128 of the electric storage apparatus 12.

As shown in FIG. 10, the certificate of space issuance unit 128 includes a space acquisition unit 1281, a signature generation unit 1282, a storage unit 1283 and a certificate generation unit 1284. Note that the storage unit 1283 stores a private key and a corresponding public key which have been generated in advance. Further, the public key stored in the storage unit 1283 is assumed to have been certified by the certificate authority 4.

The space acquisition unit 1281, signature generation unit 1282, storage unit 1283, and certificate generation unit 1284 may be implemented as software modules. The electric storage apparatus 12 or the certificate of space issuance unit 128 may include one or more processors for executing the software modules to perform the functions thereof. Alternatively, the space acquisition unit 1281, signature generation unit 1282, storage unit 1283, and/or certificate generation unit 1284 may comprise one or more specialized hardware modules, such as integrated circuit modules.

If a user places a buy order using the interface apparatus 13, a notification indicating the buy order is to be input into the charge/discharge control unit 122 via the communication unit 126. The charge/discharge control unit 122 receiving this notification detects battery space of the battery 123, and inputs information on the detected battery space into the certificate of space issuance unit 128. The information on the battery space, which has been input into the certificate of space issuance unit 128, will be acquired by the space acquisition unit 1281. And the information on the battery space acquired by the space acquisition unit 1281 is to be input into the signature generation unit 1282.

The signature generation unit 1282, to which the information on the battery space has been input, acquires a private key from the storage unit 1283, and generates a digital signature based on the information on the battery space using the private key that has been acquired. The digital signature generated by the signature generation unit 1282 is to be input into the certificate generation unit 1284 along with the information on the battery space. The certificate generation unit 1284, to which the digital signature and the information on the battery space have been input, generates a certificate of space containing the digital signature and the information on the battery space which have been input. Subsequently, the certificate of space generated by the certificate generation unit 1284 is to be input into the communication unit 126. This certificate of space is to be transmitted to the interface apparatus 13 via the communication unit 126, and to the energy trade server 5 via the interface apparatus 13.

The configuration of the electric storage apparatus 12 has been explained. As described above, a certificate of remaining is to be transmitted to the energy trade server 5 when placing a sell order, while a certificate of space is to be transmitted to the energy trade server 5 when placing a buy order. The energy trade server 5 can limit the processing of buy orders or sell orders based on certificates of remaining and certificates of space which are being transmitted on a real-time basis. As a result, it may be possible to avoid the risk of cash commodities being unable to be delivered or received.

(2-3: Configuration of Interface Apparatus 13)

Figure 11:
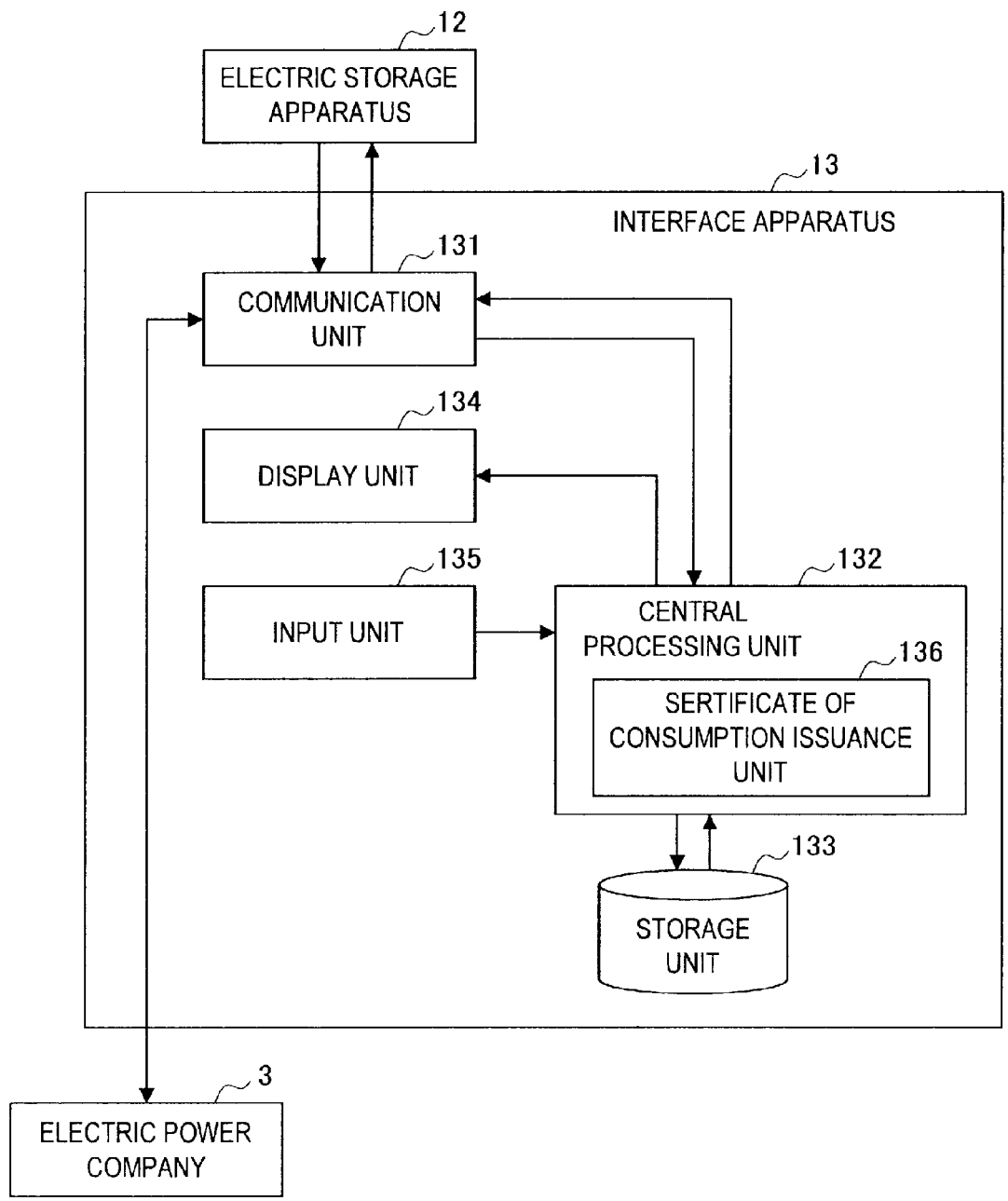
FIG. 11 is an explanatory diagram for illustrating a functional configuration of an interface apparatus according to the present embodiment.
Figure 12:
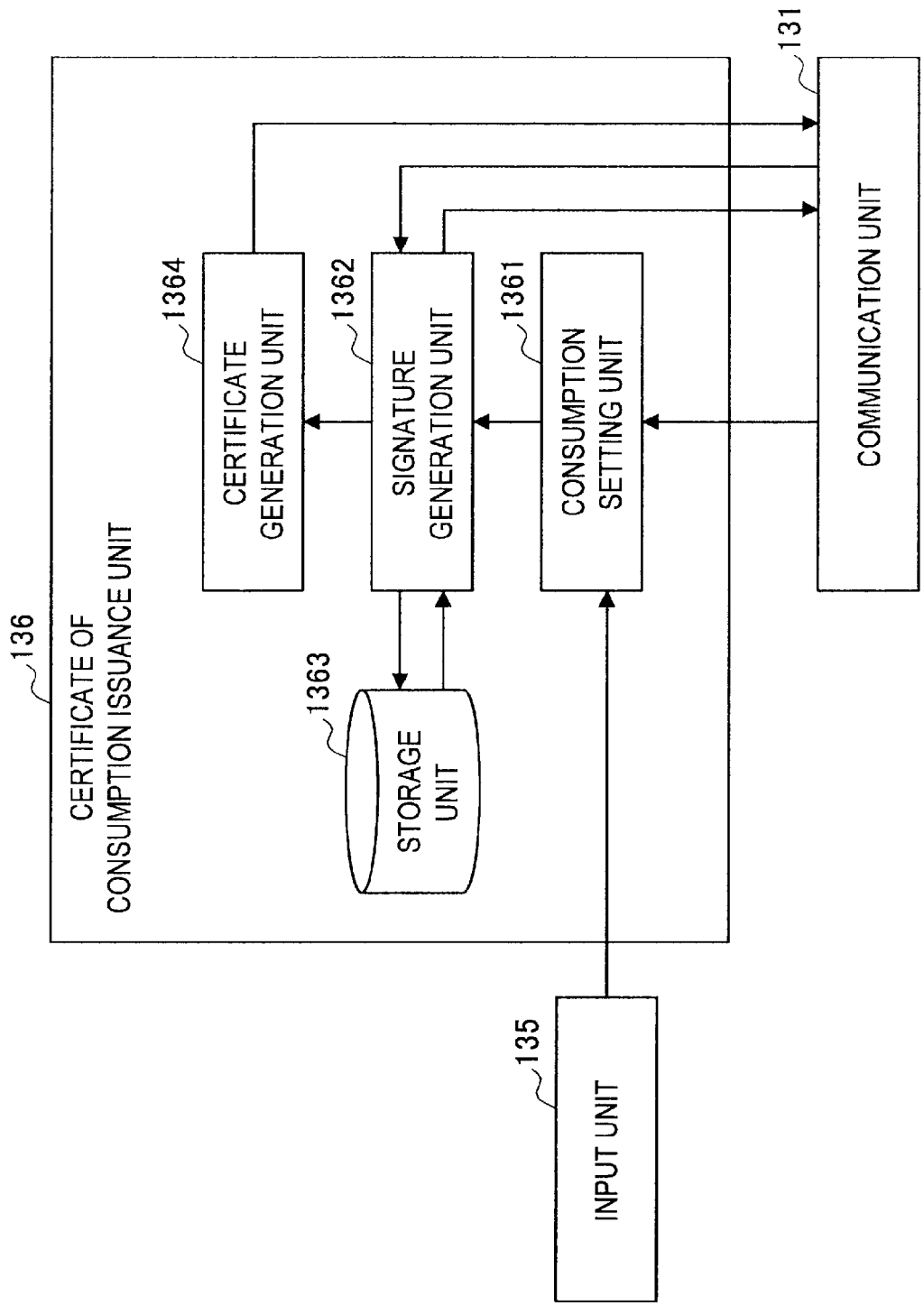
FIG. 12 is an explanatory diagram for illustrating a functional configuration of a certificate of consumption issuance unit according to the present embodiment.

With reference to FIG. 11, and FIG. 12, a configuration of the interface apparatus 13 according to the present embodiment will be explained. FIG. 11 is an explanatory diagram for illustrating a functional configuration of the interface apparatus 13 according to the present embodiment. FIG. 12 is an explanatory diagram for illustrating a functional configuration of a certificate of consumption issuance unit 136 according to the present embodiment.

As shown in FIG. 11, the interface apparatus 13 includes the communication unit 131, the central processing unit 132, the storage unit 133, the display unit 134 and the input unit 135. Note that the communication unit 131, the storage unit 133, the display unit 134 and the input unit 135 are substantially the same as the interface apparatus 13 according to the first embodiment described; therefore, a detailed explanation regarding these structural elements will be omitted and an explanation will be given regarding the functions of the central processing unit 132 (the certificate of consumption issuance unit 136) only.

As described above, restricting processing of buy orders or sell orders based on a certificate of remaining or a certificate of space makes it possible to avoid the risk of cash commodities being unable to be delivered or received. However, the remaining battery level of the battery 123 is getting decreased every second. For that reason, it is preferable to allow a user to place a sell order up to an amount of electricity calculated by subtracting a certain margin from the remaining battery level that the certificate of remaining indicates. On the other hand, it is acceptable to allow a user to place a buy order up to the amount of electricity equal to the battery space that the certificate of space indicates.

Moreover, if a certain amount of electricity consumption is expected by the time of the actual delivery of the commodities, it is preferable to allow a user to place a sell order up to the upper limit of electricity based upon consideration of the certain amount of electricity consumption expected. The certificate of consumption issuance unit 136, which is one of the functions of the central processing unit 132, includes a function to issue a certificate of consumption that authenticates the amount of expected electricity consumption.

As shown in FIG. 12, the certificate of consumption issuance unit 136 includes a consumption setting unit 1361, a signature generation unit 1362, a storage unit 1363 and a certificate generation unit 1364. Note that the storage unit 1363 stores a private key and a corresponding public key which have been generated in advance. Further, the public key stored in the storage unit 1363 is assumed to have been certified by the certificate authority 4.

The consumption setting unit 1361 monitors the amount of electricity consumption of an energy consuming device 10. The consumption setting unit 1361 detects an energy consuming device 10 which constantly consumes electricity, and calculates the amount of electricity consumption per unit of time consumed by the detected energy consuming device 10. Note that if the user specifies the energy consuming device 10 by using the input unit 135, the amount of electricity consumption per unit of time consumed by the specified energy consuming device 10 will be calculated. Then, when the user places a sell order using the input unit 135, the consumption setting unit 1361 calculates the electricity to be consumed in the prescribed period of time before the actual delivery based on the amount of electricity consumption per unit of time that has been calculated in advance, and sets the result as the electricity consumption.

The information on the electric consumption that has been set by the consumption setting unit 1361 is to be input into the signature generation unit 1362. The signature generation unit 1362, to which the information on the electric consumption has been input, acquires a private key from the storage unit 1363, and generates a digital signature based on the information on the electric consumption using the private key that has been acquired. The digital signature generated by the signature generation unit 1362 is to be input into the certificate generation unit 1364 along with the information on the electric consumption. The certificate generation unit 1364, to which the digital signature and the information on the electric consumption have been input, generates a certificate of electric consumption containing the digital signature and the information on the electric consumption which have been input. The certificate of electric consumption generated by the certificate generation unit 1364 is to be input into the communication unit 131, and is transmitted to the energy trade server 5 via the communication unit 131.

The configuration of the interface apparatus 13 according to the present embodiment has been explained above. As described above, using the certificate of consumption makes it possible to place a sell order, taking into consideration the amount of expected electricity consumption within the home energy network 1 by the time of the actual delivery of cash commodities.

(2-4: Configuration of Energy Trade Server 5)

Figure 13:
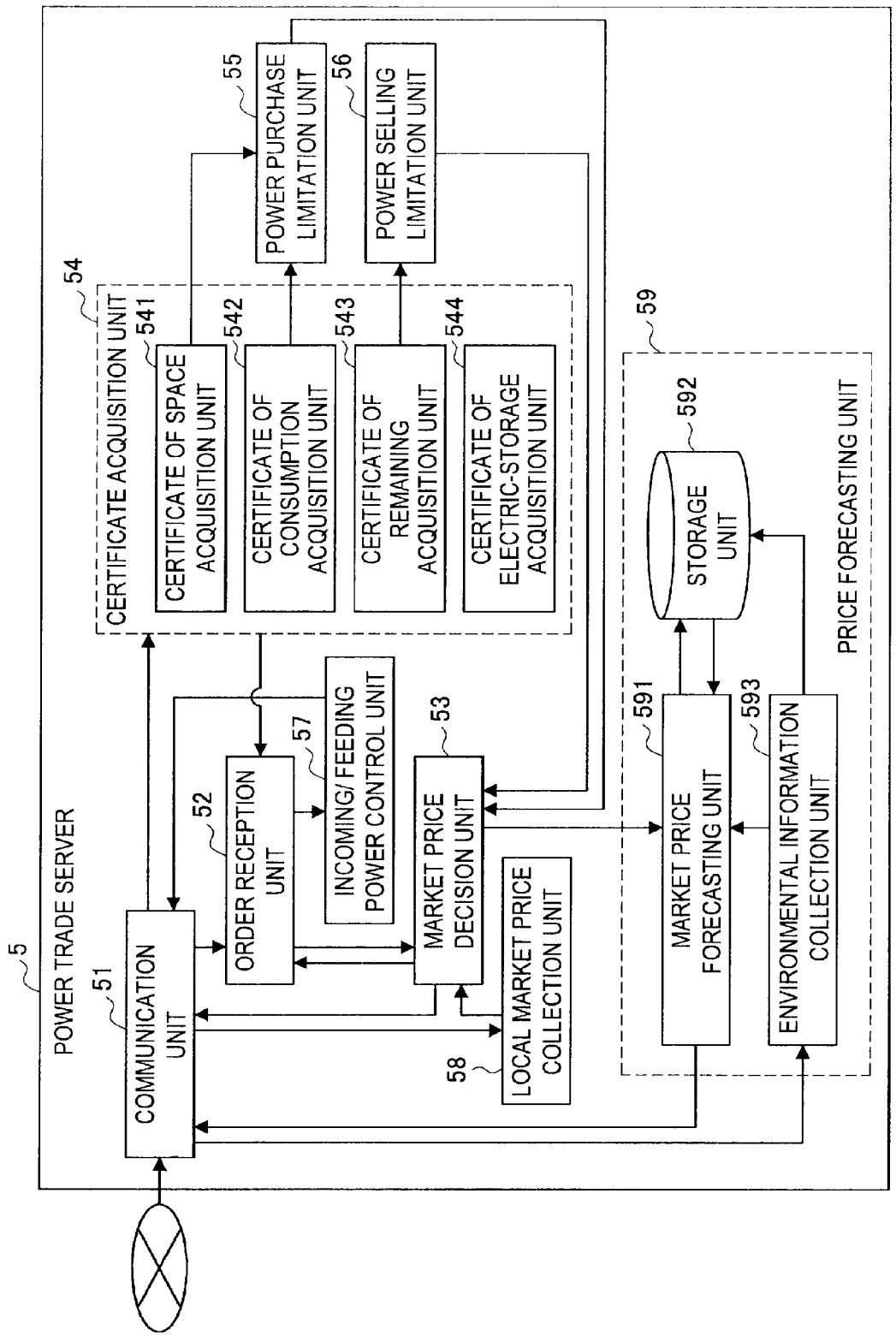
FIG. 13 is an explanatory diagram for illustrating a functional configuration of an energy trade server according to the present embodiment.

With reference to FIG. 13, functions of the energy trade server 5 according to the present embodiment will be explained. FIG. 13 is an explanation chart for illustrating a functional configuration of the energy trade server 5 according to the embodiment.

As shown in FIG. 13, the energy trade server 5 includes a communication unit 51, an order reception unit 52, a market price decision unit 53, a certificate acquisition unit 54, an energy purchase limitation unit 55, an energy selling limitation unit 56, incoming/feeding energy control unit 57, a local market price collection unit 58, and a price forecasting unit 59.

(Trading Function)

When a user places an order, information of the order is to be input into the order reception unit 52 via the communication unit 51. The order reception unit 52 receives the order based on the information of the order that has been input, and inputs the order into the market price decision unit 53. However, the order is not fixed at this stage. The market price decision unit 53 determines a buying price and a selling price (hereinafter, referred to as the market price) based on the balance of supply and demand, depending on the amount of orders that the order reception unit 52 has received. The information on the market price determined by the market price decision unit 53 is to be input into the order reception unit 52.

Note that the trading market may be divided into units of the community energy network 2. In this case, market prices in each community energy network 2 are to be studied and collected by the local market price collection unit 58. Subsequently, the information on market prices in each community energy network 2 collected by the local market price collection unit 58 is to be input into the market price decision unit 53. In this case, the market price decision unit 53 determines the whole market price based on the information on the market prices in each community energy network 2. Note that the actual deliveries in the electricity trading market of each community energy network 2 may be executed using the community electric storage apparatus 21 (refer to FIG. 7) which has been arranged in each community energy network 2.

As described above, the order reception unit 52 does not make an order fixed at the time of reception of the order from a user. When the order reception unit 52 receives the order, the certificate acquisition unit 54 acquires various certificates from the user before fixing the order. The certificate acquisition unit 54 includes a certificate of space acquisition unit 541, a certificate of consumption acquisition unit 542, a certificate of remaining acquisition unit 543, and a certificate of electric-storage acquisition unit 544.

(Buy Order)

If the order received from the user is a buy order, the certificate acquisition unit 54 acquires a certificate of space from the certificate of space acquisition unit 541, and acquires a certificate of consumption from the certificate of consumption acquisition unit 542. The certificate of space acquired by the certificate of space acquisition unit 541, and the certificate of consumption acquired by the certificate of consumption acquisition unit 542 are to be input into the energy purchase limitation unit 55. The energy purchase limitation unit 55 acquires a public key certificate corresponding to the electric storage apparatus 12 from the certificate authority 4, and verifies a digital signature contained in the certificate of space and the certificate of consumption using a public key contained in the acquired public key certificate. If the certificate of consumption cannot be acquired, however, the digital signature contained in the certificate of space only will be verified.

If successful in the verification, the energy purchase limitation unit 55 reads information on battery space contained in the certificate of space, and information on electricity consumption contained in the certificate of consumption, and inputs them into the order reception unit 52. Comparing information on the amount of electricity to buy specified by the buy order of the user, and information on remaining battery space and information on electricity consumption that the energy purchase limitation unit 55 has input, the order reception unit 52 fixes the buy order if the amount of electricity to buy is less than (the remaining battery space+electricity consumption). Subsequently, the order reception unit 52 inputs the information on the amount of electricity to buy into the incoming/feeding energy control unit 57.

The incoming/feeding energy control unit 57, to which the information on the amount of electricity to buy has been input, executes a control instruction so that the electricity for the amount of electricity bought will be supplied to the user who placed the buy order. This control instruction is to be transmitted to the electric storage apparatus 12 of the electricity supplier, the community electric storage apparatus 21, or a prescribed storage place via the communication unit 51. The electric storage apparatus 12 of the electricity supplier, the community electric storage apparatus 21, or a prescribed storage place supplies electricity for the amount of electricity bought to the electric storage apparatus 12 of the user who has placed the buy order.

(Sell Order)

If the order received by the user is a sell order, the certificate acquisition unit 54 acquires a certificate of remaining from the certificate of remaining acquisition unit 543, and acquires a certificate of electric-storage from the certificate of electric-storage acquisition unit 544. The certificate of remaining acquired by the certificate of remaining acquisition unit 543 is to be input into the energy selling limitation unit 56. The energy selling limitation unit 56 acquires a public key certificate corresponding to the electric storage apparatus 12 from the certificate authority 4, and verifies a digital signature contained in the certificate of remaining using a public key contained in the acquired public key certificate. If successful in the verification, information on the remaining battery level contained in the certificate of remaining will be input into the order reception unit 52.

The certificate of electric-storage acquisition unit 544 acquires the public key certificate corresponding to the electric storage apparatus 12 from the certificate authority 4, and verifies a digital signature contained in the acquired certificate of electric-storage using the public key contained in the acquired public key certificate. If succeeded in the verification, information on modified electric-generation capacity contained in the certificate of electric-storage will be input into the order reception unit 52. As described earlier, the certificate of electric-storage is a certificate that authenticates the electricity is green energy. Therefore, the electricity for the modified electric-generation capacity contained in the certificate of electric-storage is to be bought at the green energy price. If the electricity to sell is not green energy, a certificate of electric-storage will not be acquired. In this case, the certificate of electric-storage acquisition unit 544 inputs a notification that the electricity is not green energy into the order reception unit 52. Here, however, it is assumed that a certificate of electric-storage can be acquired.

When the information on remaining battery level and the information on modified electric-generation capacity have been input, the order reception unit 52 fixes the sell order if the amount of electricity to sell is less than the remaining battery level, comparing information on the amount of electricity to sell specified by the sell order of the user and information on the remaining battery level that the energy selling limitation unit 56 has input. Subsequently, the order reception unit 52 acquires a market price of green energy from the market price decision unit 53, and fixes the sell order at the market price of green energy for the amount of the modified electric-generation capacity that the certificate of electric-storage acquisition unit 544 has input, out of the amount of electricity to sell specified by the sell order. Further, the order reception unit 52 acquires a market price of green energy from the market price decision unit 53, and fixes the sell order at the general market price for the amount of electricity to sell.

Then, the order reception unit 52 inputs information on the amount of electricity to sell to the incoming/feeding energy control unit 57. The incoming/feeding energy control unit 57, to which the information on the amount of electricity to sell has been input, executes a control instruction so that the electricity for the amount of electricity to sell will be transmitted to the prescribed storage place from the electric storage apparatus 12 of the user who has placed the sell order. This control instruction will be transmitted to the electric storage apparatus 12 of the user who has placed the sell order via the communication unit 51. The electric storage apparatus 12 that has received the control instruction transmits the electricity for the amount of the electricity to sell to the prescribed storage place.

(Price Forecast Function)

The price forecasting by the energy trade server 5 will be explained. The price forecasting unit 59 includes a market price forecasting unit 591, a storage unit 592, and an environmental information collection unit 593. The market price forecasting unit 591 forecasts future market prices based on changes in the buying and selling prices of electricity determined by the market price decision unit 53 in the past, the current buying and selling prices, changes in the amount of trade in the past, the current amount of trade, and environmental information collected by the later-described environmental information collection unit 593.

The environmental information collection unit 593 implements a method for collecting information regarding environmental factors affecting the amount of electricity by green energy. For example, the environmental information collection unit 593 collects environmental information such as weather forecasts in the past and at present. Moreover, the environmental information collection unit 593 inputs the collected environmental information into the storage unit 592. The environmental information accumulated in the storage unit 592 is referenced by the market price forecasting unit 591, and will be used for forecasting of market prices. For example, if the weather has been rainy or cloudy with little sunshine for many days, it may be forecast that the amount of energy supplied by photovoltaic generation will decrease. In this case, the price of green energy is to be forecast higher than usual.

The market price predicted in such manner will be transmitted to the interface apparatus 13 of each user and the electric utility company 3 via the communication unit 51.

The function of the energy trade server 5 according to the present embodiment has been explained above.

3: Third Embodiment (Services Based on a Green Certificate)

Hereinafter, the third embodiment will be explained. Note that structural elements that have functions and structures substantially the same as those of the structural elements according to the first and second embodiments described above are denoted with the same reference numerals, and repeated explanation of these structural elements is omitted.

(3-1: Configuration of Mobile Device 6)

With reference to FIG. 14, an explanation will be given regarding the configurations of a mobile device 6 and an energy reception apparatus 7 according to the third embodiment of the present invention. FIG. 14 is an explanatory diagram for illustrating a configuration of a green energy generation system according to the present embodiment. Note that a concrete example of the mobile device 6 is a personal computer, a mobile phone, a portable game machine, a portable information terminal, an information home appliance, a car navigation system, or the like.

As shown in FIG. 14, the mobile device 6 includes energy consuming parts 60, a green energy generation apparatus 61, an electric storage apparatus 62, an interface apparatus 63, and a value information acquisition unit 64. The energy reception apparatus 7 includes an electric energy receiving unit 71, a signature verification unit 72, and a value information issuance unit 73.

The energy consuming parts 60 are electric parts for realizing each function of the mobile device 6. The green energy generation apparatus 61 performs substantially the same function as the green energy generation apparatus 11 according to the first embodiment described above. The green energy generation apparatus 61 is, however, included within an object small enough to be able to mount on the mobile device 6.

The electric storage apparatus 62 is, similar to the green energy generation apparatus 61, included within an object small enough to be able to mount on the mobile device 6. Moreover, the electric storage apparatus 62, different from the electric storage apparatus 12 according to the first embodiment described above, may not issue a certificate of electric-storage. In this case, a certificate of electric-generation will be utilized instead of the certificate of electric-storage. Note that omitting the function to issue the certificate of electric-storage contributes to making the mobile device 6 smaller and much more energy-saving.

The interface apparatus 63 performs a method for receiving a user's operation, and a method for displaying information to the user. The value information acquisition unit 64 acquires value information from the energy reception apparatus 7. This value information is, for example, a coupon or electric money, or the like. Note that the communication between the mobile device 6 and the energy reception apparatus 7 may be wired or wireless. The energy transmission between the mobile device 6 and the energy reception apparatus 7 may be in a non-contact manner using electromagnetic induction, or in a wired manner using energy lines.

When the user operation instructs transmission of electricity from the electric storage apparatus 62 to the energy reception apparatus 7, the electricity discharged from the electric storage apparatus 62 is to be received by the electric energy receiving unit 71 of the energy reception apparatus 7. At this time, the certificate of electric-generation that has been issued by the green energy generation apparatus 61 is transmitted to the energy reception apparatus 7 via the interface apparatus 63. This certificate of electric-generation is to be received by the signature verification unit 72 of the energy reception apparatus 7. The signature verification unit 72 that has received the certificate of electric-generation acquires a public key certificate corresponding to the green energy generation apparatus 61 from the certificate authority 4, and verifies a digital signature contained in the acquired certificate of electric-generation using a public key contained in the acquired public key certificate.

If successful in the verification, the signature verification unit 72 outputs the certificate of electric-generation externally as well as inputs information on the electric-generation capacity contained in the certificate of electric-generation into the value information issuance unit 73. The value information issuance unit 73, to which the information on the electric-generation capacity has been input, transmits the value information corresponding to the electric-generation capacity to the mobile device 6 based on the information on the electric-generation capacity that has been input. The value information transmitted to the mobile device 6 is to be received by the value information acquisition unit 64 of the mobile device 6, and to be input into the interface apparatus 63. The interface apparatus 63 stores the value information that has been input by the value information acquisition unit 64.

The configurations of the mobile device 6 and the energy reception apparatus 7 according to the present embodiment have been explained above.

(3-2: Configuration of Green Energy Generation Apparatus 61)

With reference to FIG. 15 and FIG. 16, an explanation will be given regarding the configuration of a green energy generation apparatus 61 according to the present embodiment. FIG. 15 is an explanatory diagram for illustrating a functional configuration of the green energy generation apparatus 61 according to the present embodiment. FIG. 16 is an explanatory diagram for illustrating a functional configuration of a certificate of electric-generation issuance unit 614 according to the present embodiment.

(Overall Configuration)

As shown in FIG. 15, the green energy generation apparatus 61 includes a photovoltaic panel 611, an electric-generation capacity measurement unit 612, an electric energy transmission unit 613, a certificate of electric-generation issuance unit 614, and a communication unit 615. Note that in the following description, the electric-generation capacity measurement unit 612 and the certificate of electric-generation issuance unit 614 may be collectively called a certificate module.

The electric-generation capacity measurement unit 612, certificate of electric-generation issuance unit 614, and communication unit 615 may be implemented as software modules. The green energy generation apparatus 61 may include one or more processors for executing the software modules to perform the functions thereof. Alternatively, the electric-generation capacity measurement unit 612, certificate of electric-generation issuance unit 614, and/or communication unit 615 may comprise one or more specialized hardware modules, such as integrated circuit modules.

The photovoltaic panel 611 performs a method for generating energy by converting the energy of solar light into electricity. The photovoltaic panel 611 utilizes, for example, silicon solar cells or dye-sensitized solar cells or the like. The electricity generated by the photovoltaic panel 611 is to be input into the electric-generation capacity measurement unit 612. The electric-generation capacity measurement unit 612 measures the electric-generation capacity of the photovoltaic panel 611. Information on the electric-generation capacity measured by the electric-generation capacity measurement unit 612 is to be input into the certificate of electric-generation issuance unit 614.

The electricity generated by the photovoltaic panel 611 is to be input into the electric energy transmission unit 613 via the electric-generation capacity measurement unit 612. The electric energy transmission unit 613, to which the electricity generated by the photovoltaic panel 611 is input, transmits the input electricity to the energy consuming parts 60 or the electric storage apparatus 62. Note that in the description herein, the electricity output by the electric energy transmission unit 613 is to be transmitted to the electric storage apparatus 62.

The certificate of electric-generation issuance unit 614, to which the information on the electric-generation capacity has been input from the electric-generation capacity measurement unit 612, issues a certificate of electric-generation containing the input information on the electric-generation capacity. Note that the detailed functional configuration of the certificate of electric-generation issuance unit 614 will be described later. The certificate of electric-generation that has been issued by the certificate of electric-generation issuance unit 614 is to be input into the communication unit 615. The communication unit 615, to which the certificate of electric-generation has been input, transmits the input certificate of electric-generation to the interface apparatus 63.

(Details of the Certificate of Electric-Generation Issuance Unit 614)

An explanation will be given regarding the detailed functional configuration of the certificate of electric-generation issuance unit 614. As shown in FIG. 16, the certificate of electric-generation issuance unit 614 includes a signature generation unit 6141, a storage unit 6142, and a certificate generation unit 6143. Note that the storage unit 6142 stores a private key and a corresponding public key which have been generated in advance. Further, the public key stored in the storage unit 6142 is assumed to have been certified by the certificate authority 4.

The signature generation unit 6141, storage unit 6142, and certificate generation unit 6143 may be implemented as software modules. The green energy generation apparatus 61 or certificate of electric-generation issuance unit 614 may include one or more processors for executing the software modules to perform the functions thereof. Alternatively, the signature generation unit 6141, storage unit 6142, and/or certificate generation unit 6143 may comprise one or more specialized hardware modules, such as integrated circuit modules.

In the event that the information on the electric-generation capacity is input from the electric-generation capacity measurement unit 612 to the certificate of electric-generation issuance unit 614, the input information on the electric-generation capacity is to be input into the signature generation unit 6141. The signature generation unit 6141, to which the information on the electric-generation capacity has been input, acquires a private key from the storage unit 6142, and generates a digital signature based on the information on the electric-generation capacity using the private key that has been acquired. The digital signature generated by the signature generation unit 6141 is to be input into the certificate generation unit 6143 along with the information on the electric-generation capacity. The certificate generation unit 6143, to which the digital signature and the information on the electric-generation capacity have been input, generates a certificate of electric-generation containing the digital signature and the information on the electric-generation capacity which have been input. Subsequently, the certificate of electric-generation generated by the certificate generation unit 6143 is to be input into the communication unit 615.

The configuration of the green energy generation apparatus 61 according to the present embodiment has been explained above.

(3-3: Configuration of Electric Storage Apparatus 62)

With reference to FIG. 17, the configuration of the electric storage apparatus 62 according to the present embodiment will be explained. FIG. 17 is an explanatory diagram for illustrating a functional configuration of the electric storage apparatus 62 according to the present embodiment.

(Overall Configuration)

As shown in FIG. 17, the electric storage apparatus 62 includes an electric energy receiving unit 621, a charge/discharge control unit 622, a battery 623, and an electric energy transmission unit 624.

(At Receiving)

At first, the electricity supplied by the green energy generation apparatus 61 is to be received by the electric energy receiving unit 621. The electricity received by the electric energy receiving unit 621 is to be input into the charge/discharge control unit 622. The charge/discharge control unit 622, to which the electricity has been input by the electric energy receiving unit 621, outputs the electricity to the battery 623 so as to recharge the battery 623.

(At Transmitting)

If the battery 623 receives an instruction to discharge via the interface apparatus 63, the instruction is to be input into the charge/discharge control unit 622. The charge/discharge control unit 622, to which the instruction for discharging has been input, discharges the amount of electricity based on the instruction from the battery 623. The electricity that has been discharged from the battery by the charge/discharge control unit 622 is to be input into the electric energy transmission unit 624, and is to be transmitted to the energy consuming parts 60 or the energy reception apparatus 7 from the electric energy transmission unit 624. In this example, however, it is assumed to be transmitted to the energy reception apparatus 7.

The configuration of the electric storage apparatus 62 according to the present embodiment has been explained above.

(3-4: Configuration of Interface Apparatus 63)

With reference to FIG. 18, the configuration of the interface apparatus 63 according to the present embodiment will be explained. FIG. 18 is an explanatory diagram for illustrating a functional configuration of the interface apparatus 63 according to the present embodiment.

As shown in FIG. 18, the interface apparatus 63 includes a communication unit 631, a central processing unit 632, a storage unit 633, a display unit 634 and an input unit 635.

When the electricity is discharged from the electric storage apparatus 62, a user inputs information on the amount of discharged electricity or the like using the input unit 635. The information that has been input using the input unit 635 is to be input into the electric storage apparatus 62 via the central processing unit 632 and the communication unit 631. When the process of discharging electricity is performed by the electric storage apparatus 62, the communication unit 631 receives a certificate of electric-generation from the green energy generation apparatus 61. The certificate of electric-generation received by the communication unit 631 is to be input into the central processing unit 632. The central processing unit 632, to which the certificate of electric-generation has been input, transmits the input certificate of electric-generation to the energy reception apparatus 7 via the communication unit 631.

Further, when the user inputs an instruction to discharge using the input unit 635, the central processing unit 632 transmits a discharging instruction and information on the amount of electricity to discharge to the electric storage apparatus 62 via the communication unit 631. Note that the storage unit 633 is used to store value information received from the energy reception apparatus 7, or information that a user has input, or is used to store a public key or the like corresponding to the green energy generation apparatus 61 as needed. The storage unit 633 is used to store a program that defines operations of the central processing unit 632.

The configuration of the interface apparatus 63 according to the present embodiment has been explained above.

(3-5: Operation for Transmitting Electric Energy)

Figure 19:
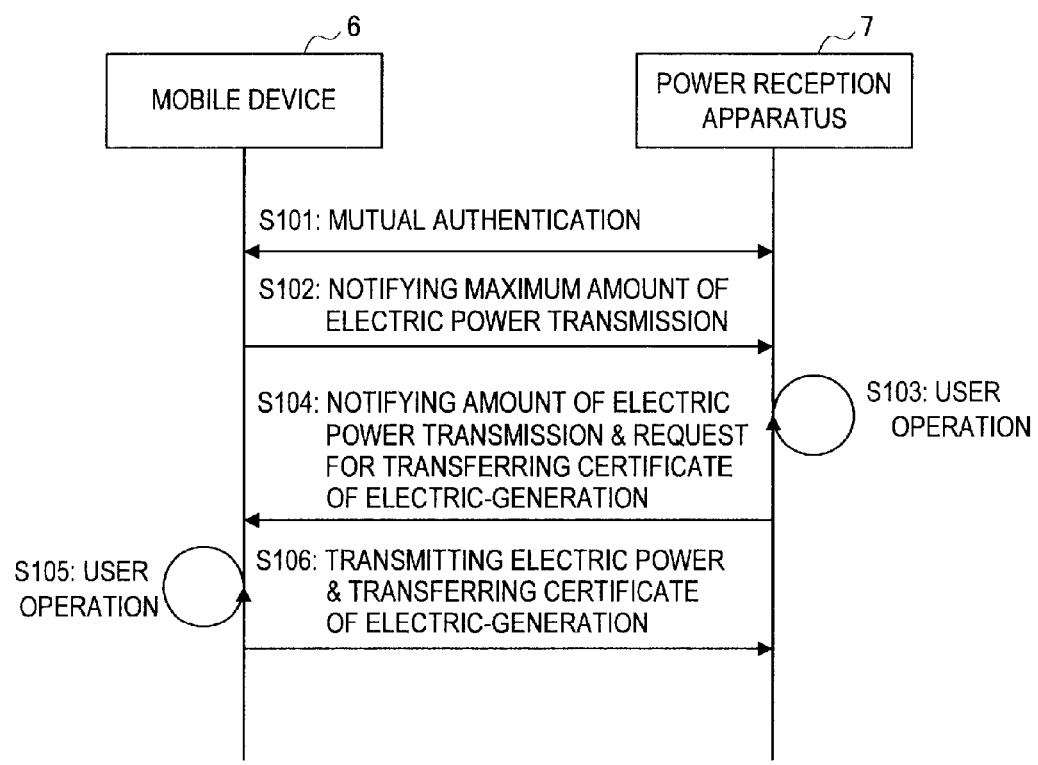
FIG. 19 is an explanatory diagram for illustrating a flow of operation for transmitting electric energy according to the present embodiment.
Figure 20:
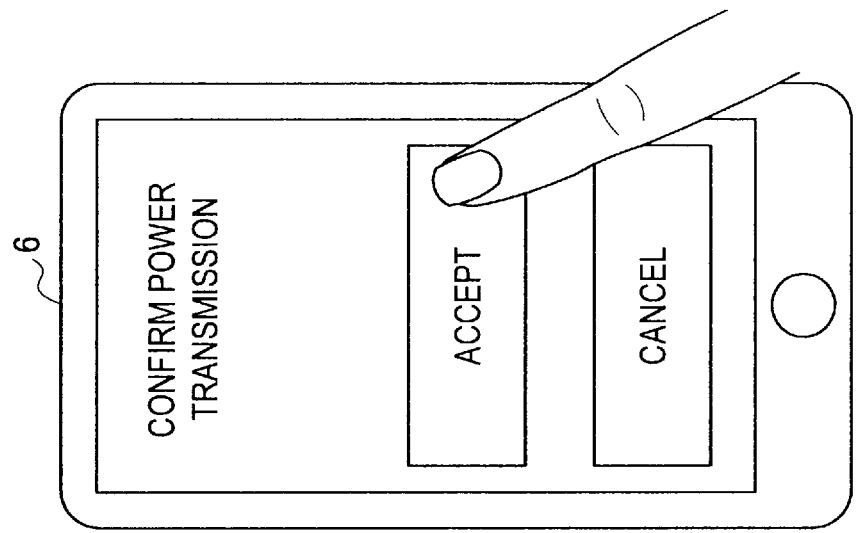
FIG. 20 is an explanatory diagram for illustrating a flow of operation for transmitting electric energy according to the present embodiment.
Figure 20:
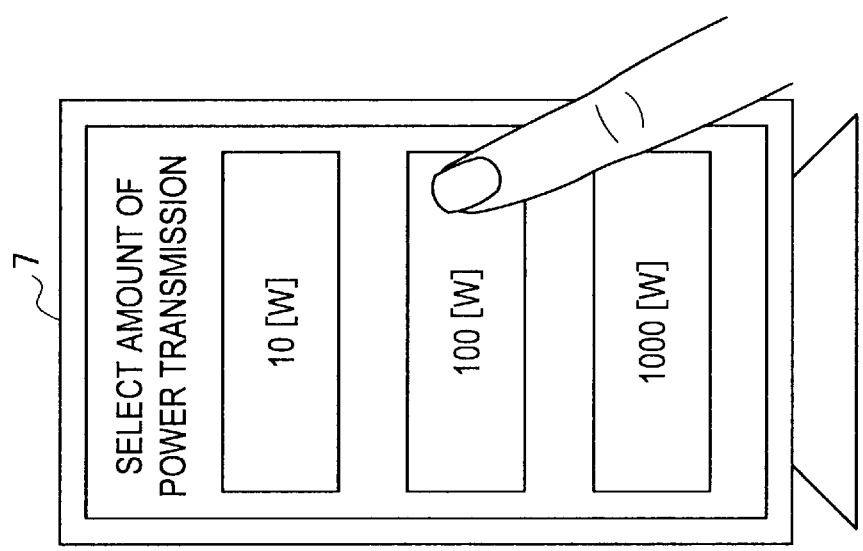

Next, with reference to FIG. 19 and FIG. 20, the method for transmitting electric energy will be explained. FIG. 19 is an explanatory diagram for illustrating a flow of operation for transmitting electric energy according to the present embodiment. FIG. 20 is an explanatory diagram for illustrating an example of a graphical interface to be displayed in the flow of operation for transmitting electric energy according to the present embodiment.

As shown in FIG. 19, the mobile device 6 and the energy reception apparatus 7 execute a mutual authentication (S101). If successful in the mutual authentication, the mobile device 6 notifies the energy reception apparatus 7 of the maximum amount of electric energy transmission (S102). This maximum amount of electric energy transmission is the remaining battery level of the battery 623, the remaining level calculated by subtracting a certain margin necessary for the operation of the mobile device 6 from the remaining battery level, or the maximum value of the amount of energy transmission which has been input by a user. The energy reception apparatus 7 encourages the user to select the amount of energy transmission and allows the user to select the amount of energy transmission (S103), as shown in FIG. 20.

If the electric-generation capacity has been selected by the user, the energy reception apparatus 7 notifies the mobile device 6 of the electric-generation capacity selected by the user, and requests the transfer of a certificate of electric-generation as well (S104). Subsequently, the mobile device 6 encourages the user to select whether to allow energy transmission, as shown in FIG. 2 (S105). If the user allows the energy transmission, the mobile device 6 starts to transmit electricity, and transmits (assigns) the certificate of electric-generation to the energy reception apparatus 7 as well (S106). Note that granting value information will be done after the step S106 in accordance with the electric-generation capacity that is authenticated by the certificate of electric-generation.

The method for transmitting electric energy according to the present embodiment has been explained above.

<4: Example of Hardware Configuration>

Figure 21:
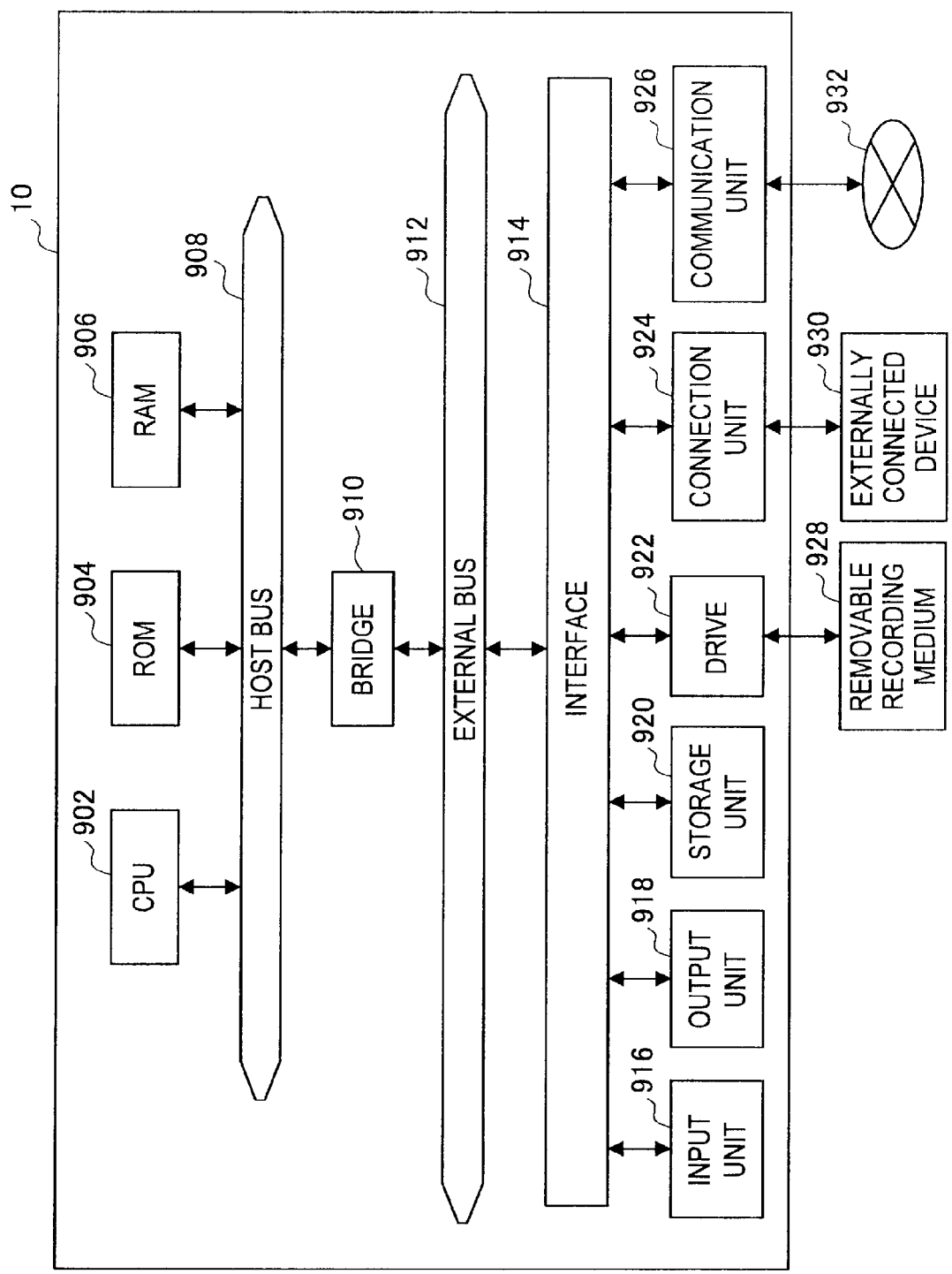

The functions of the various types of certificate issuance units, interface apparatuses, mobile devices, energy trade servers, or the like described above can be realized by using the hardware configuration of an information processing apparatus shown in FIG. 21, for example. That is, the function of each structural element is realized by controlling the hardware shown in FIG. 21 by using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 21, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or aurally notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection unit 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

The example of a hardware configuration capable of realizing functions of the interface apparatus, the mobile device, the energy trade server, or the like according to the present embodiment has been explained above.

<5: Conclusion>

Lastly, the technical contents according to the embodiments will be briefly described. The technical contents stated here can be part of various apparatuses, such as a PC, a mobile phone, a portable game machine, a portable information terminal, an information appliance, a car navigation system, and the like. For example, a green energy generation apparatus described below can be mounted on such apparatuses.

The green energy generation apparatus according to the present embodiment includes a green energy generator, an electric-generation capacity measurement unit, and a certificate of electric-generation issuance unit, which are like the following. The green energy generation apparatus generates electricity using renewable energy or environmentally friendly resources. The above electric-generation capacity measurement unit measures the electric-generation capacity generated by the green electric energy generation unit. Further, the above certificate of electric-generation issuance unit acquires electric-generation capacity information indicating the electric-generation capacity measured by the electric-generation capacity measurement unit, and issues a certificate of electric-generation that authenticates the validity of the acquired electric-generation capacity information.

By using the certificate of electric-generation issued in such a manner, it may be possible to prove the electric-generation capacity generated by green electric energy generation to other people. For example, it may be possible to develop a structure in which electricity can be bought at a green energy price when selling electricity along with a green certificate. For another example, it may be possible to trade electricity at a price for green energy by trading any arbitrary electricity with the green certificate.

Thus, if green certificate changes the trading price, the green certificate will have monetary value. If the green certificate has the monetary value, the green certificate can be treated as a marketable security. As a result, the value of green generation becomes apparent electric energy consumers, and contributes the spread of the green electric energy generation apparatus. Needless to say, when the green energy generation apparatus becomes widespread and replaces electric energy generation using fossil fuels, the green energy generation will hinder the decline of the global environment, even if only a little.

An embodiment has been explained in detail above with reference to the attached drawings. However, the present invention is not limited to this example. It should be understood by those skilled in the art that various modifications, combinations, sub-combinations and alterations may occur depending on design requirements and other factors insofar as they are within the scope of the appended claims or the equivalents thereof.

Photovoltaic generation has been described as an example of green electric energy generation in the above explanation; however, the technology according to the present embodiment can be applied to various types of generation, such as wind energy generation, geothermal energy generation, hydro energy generation, atomic energy generation, biomass energy generation, natural gas generation, fuel cell generation, and the like. A battery has been described as an example of method of charging electric energy. Specifically, the technology according to the present embodiment can be applied in the same way to various methods of charging electric energy, such as a secondary battery (Li-Ion battery, NaS battery, or the like), a capacitor (an electric double-layer capacitor, or the like), a lift storage system, or the like.

The present application contains subject matter related to that disclosed in Japanese Priority Patent Application JP 2010-026563 filed in the Japan Patent Office on Feb. 9, 2010, the entire content of which is hereby incorporated by reference.

Reference Signs List
- 1 Home energy network
- 10 Energy consuming device
- 11 Green energy generation apparatus
- 111 Photovoltaic panel
- 112 Electric-generation capacity measurement unit
- 113 Electric energy transmission unit
- 114 Certificate of consumption issuance unit
- 1141 Signature generation unit
- 1142 Storage unit
- 1143 Certificate of consumption issuance unit
- 115 Communication unit
- 12 Electric storage apparatus
- 121 Electric energy receiving unit
- 122 Charge/discharge control unit
- 123 Battery
- 124 Electric energy transmission unit
- 125 Certificate of electric-storage issuance unit 125
- 1251 Signature verification unit
- 1252 Electric-generation capacity modification unit
- 1253 Signature generation unit
- 1254 Storage unit
- 1255 Certificate generation unit
- 126 Communication unit
- 127 Certificate of remaining issuance unit
- 1271 Remaining acquisition unit
- 1272 Signature generation unit
- 1273 Storage unit
- 1274 Certificate generation unit
- 128 Certificate of space issuance unit
- 1281 Space acquisition unit
- 1282 Signature generation unit
- 1283 Storage unit
- 1284 Certificate generation unit
- 13 Interface apparatus
- 131 Communication unit
- 132 Central processing unit
- 133 Storage unit
- 134 Display unit
- 135 Input unit
- 136 Certificate of consumption issuance unit
- 1361 Consumption setting unit
- 1362 Signature generation unit
- 1363 Storage unit
- 1364 Certificate generation unit
- 2 Community energy network
- 20 Energy network
- 21 Community electric storage apparatus
- 3 Electric utility company
- 4 Certificate authority
- 5 Energy trade server
- 51 Communication unit
- 52 Order reception unit
- 53 Market price decision unit
- 54 Certificate acquisition unit
- 541 Certificate of space acquisition unit
- 542 Consumption certificate acquisition unit
- 543 Certificate of remaining acquisition unit
- 544 Certificate of electric-storage acquisition unit
- 55 Energy purchase limitation unit
- 56 Energy selling limitation unit
- 57 Incoming/feeding energy control unit
- 58 Local market price collection unit
- 59 Price forecasting unit
- 591 Market price forecasting unit
- 592 Storage unit
- 593 Environmental information collection unit
- 6 Mobile device
- 60 Energy consuming parts
- 61 Green energy generation apparatus
- 611 Photovoltaic panel
- 612 Electric-generation capacity measurement unit
- 613 Electric energy transmission unit
- 614 Certificate of electric-generation issuance unit
- 6141 Signature generation unit
- 6142 Storage unit
- 6143 Certificate generation unit
- 615 Communication unit 62 Electric storage apparatus
621 Electric energy receiving unit
622 Charge/discharge control unit
623 Battery
624 Electric energy transmission unit
63 Interface apparatus
631 Communication unit
632 Central processing unit
633 Storage unit
634 Display unit
635 Input unit
64 Value information acquisition unit
7 Energy reception apparatus
71 Electric energy receiving unit
72 Signature verification unit
73 Value information issuance unit

The invention claimed is:

1. A method for authenticating characteristics of electrical energy, comprising:
   acquiring a key;
   acquiring an amount of electrical energy generated by a household green energy generation apparatus;
   generating a digital signature based on the amount and the key; and
   generating a certificate comprising the signature and the amount.

2. An apparatus for authenticating characteristics of electrical energy, comprising:
   an energy generator; and
   a processor configured to:
      acquire a key;
      acquire an amount of electrical energy generated by a household green energy generation apparatus; and
      generate a digital signature based on the amount and the key.

3. A green energy generation apparatus, comprising:
   a household green energy generation unit for generating electrical energy using renewable energy or environmentally friendly resources;
   an electric-generation capacity measurement unit for measuring electric-generation capacity generated by the household green energy generation unit;
   a certificate of electric-generation issuance unit for acquiring electric-generation capacity information that indicates the electric-generation capacity measured by the electric-generation capacity measurement unit and for issuing a certificate of electric-generation that authenticates the acquired electric-generation capacity is generated by the household green energy generation unit;
   an electric energy transmission unit for transmitting the electrical energy generated by the household green energy generation unit to an electric storage apparatus;
   a certificate of electric-generation providing unit for providing the certificate of electric-generation issued by the certificate of electric-generation issuance unit to the electric storage apparatus.

4. The green energy generation apparatus according to claim 3, wherein the electric storage apparatus further comprises:
   a battery that is to be charged upon receiving electrical energy transmitted from the electric energy transmission unit;
   a certificate of electric-generation acquisition unit for acquiring the certificate of electric-generation provided by the certificate of electric-generation providing unit;
   a discharge control unit for discharging the electrical energy from the battery to supply the electrical energy to another apparatus;
   a certificate of electric-storage issuance unit for issuing a certificate of electric-storage that authenticates an electric-generation capacity modified from the electric-generation capacity authenticated by the certificate of electric-generation based on storage efficiency of the battery is generated by the household green energy generation unit; and
   a certificate of electric-storage providing unit for providing the other apparatus with a certificate of electric-storage corresponding to an amount of the discharged electrical energy, the certificate being issued by the certificate of electric-storage issuance unit, when the electrical energy discharged by the discharge control unit is supplied to the other apparatus.

5. The green energy generation apparatus according to claim 3, wherein the electric storage apparatus and the green energy generation apparatus are combined as a unit.

6. The green energy generation apparatus according to claim 3, wherein the certificate of electric-generation includes at least any one of information that indicates type of green energy generation, information that indicates a degree of environmental load at the time of energy generation, or information on an area where the electrical energy is generated.

7. The green energy generation apparatus according to claim 3, wherein the certificate of electric-generation issuance unit further comprises:
   a storage unit for storing a private key, and a public key that has been certified by the certificate authority;
   a signature generation unit for generating a digital signature using the private key that has been acquired from the storage unit; and
   a certificate generation unit for generating the certificate of electric-generation with an addition of the digital signature to the information on the electric-generation capacity.

8. A mobile device, comprising:
   a household green energy generation apparatus for generating electrical energy using renewable energy or environmentally friendly resources that includes an electric-generation capacity measurement unit for measuring electric-generation capacity generated by the household green energy generation apparatus, a certificate of electric-generation issuance unit for acquiring electric-generation capacity information that indicates the electric-generation capacity measured by the electric-generation capacity measurement unit and for issuing a certificate of electric-generation that authenticates the acquired electric-generation capacity is generated by the household green energy generation apparatus, and an electric energy transmission unit for transmitting the electrical energy generated by the household green energy generation apparatus; and
   an electric storage apparatus for storing the electrical energy that is generated by the household green energy generation apparatus and transmitted from the electric energy transmission unit.

9. The mobile device according to claim 8, comprising:
   a discharge control unit for discharging electrical energy from the electric storage apparatus to supply the electrical energy to another apparatus;
   an interface apparatus wherein a user instructs an electric energy transmission from the electric storage apparatus to the other apparatus; and a certificate of electric-storage providing unit for providing a certificate of electric-storage which authenticates the electrical energy discharged to the other apparatus is generated by the household green energy generation apparatus, when the electrical energy discharged from the electric storage apparatus by the discharge control unit is supplied to the other apparatus.

10. The mobile device according to claim 9, further comprising:
a value information acquisition unit for acquiring information on a coupon having cash value or electric money; and
a storage unit for recording the information on the coupon or the electric money,
wherein the certificate of electric-storage is to be converted into a coupon or electric money having value corresponding to an amount of electrical energy authenticated by the certificate of electric-storage in the other apparatus provided with the certificate of electric-storage, and
wherein the coupon or the electric money converted in the other apparatus provided with the certificate of electric-storage is to be acquired from the other apparatus by the value information acquisition unit and to be recorded in the storage unit.

11. An electric storage apparatus, comprising:
a battery that is to be charged upon supply of electrical energy generated by a household green energy generation unit from a household green energy generation apparatus that includes the household green energy generation unit for generating electrical energy using renewable energy or environmentally friendly resources, an electric-generation capacity measurement unit for measuring electric-generation capacity generated by the household green energy generation unit, a certificate of electric-generation issuance unit for acquiring electric-generation capacity information that indicates the electric-generation capacity measured by the electric-generation capacity measurement unit and for issuing a certificate of electric-generation in order to authenticate that the acquired electric-generation capacity is generated by the household green energy generation unit; and
a certificate acquisition unit for acquiring the certificate of electric-generation issued by the certificate of electric-generation issuance unit when the battery is charged with supply of electrical energy from the household green energy generation unit.

12. The electric storage apparatus according to claim 11, further comprising:
an electric-generation capacity modification unit for modifying electric-generation capacity information authenticated by the certificate of electric-generation based on storage efficiency of the battery;
a certificate of electric-storage issuance unit for issuing a certificate of electric-storage in order to authenticate that the electric-generation capacity modified by the electric-generation capacity modification unit is generated by the household green energy generation unit;
a discharge control unit for discharging electrical energy from the battery to supply the electrical energy to another apparatus; and
a certificate of electric-storage providing unit for providing the other apparatus with a certificate of electric-storage corresponding to an amount of the discharged electrical energy, the certificate being issued by the certificate of electric-storage issuance unit, when the electrical energy discharged by the discharge control unit is supplied to the other apparatus.

13. The electric storage apparatus according to claim 12, wherein the certificate of electric-generation includes at least any one of information that indicates type of household green energy generation, information that indicates a degree of environmental load at the time of energy generation, or information on an area where the electrical energy is generated, and
the certificate of electric-storage includes what the certificate of electric-generation includes among information that indicates type of household green energy generation, information that indicates a degree of environmental load at the time of energy generation, or information on an area where the electrical energy is generated.

14. The electric storage apparatus according to claim 12, further comprising
a certificate of remaining issuance unit for issuing a certificate of remaining in order to verify remaining battery level.

15. The electric storage apparatus according to claim 12, further comprising
a certificate of space issuance unit for issuing a certificate of space in order to verify battery space.

16. The electric storage apparatus according to claim 12, wherein
the certificate of electric-storage can be traded independently after being securitized.

17. The electric storage apparatus according to claim 12, wherein
when information on an amount of discharged electrical energy is input by a user using an input unit of an interface apparatus, the discharge control unit supplies electrical energy corresponding to the input information on the amount of discharged electrical energy from the battery to the other apparatus, and the certificate of electric-storage issuance unit issues the certificate of electric-storage corresponding to the amount of discharged electrical energy to be provided to the other apparatus from the certificate of electric-storage issuance unit.

18. The electric storage apparatus according to claim 17, wherein
the electric storage apparatus and the interface apparatus are combined as a unit.

19. The electric storage apparatus according to claim 11, wherein
the battery is to be charged with electrical energy from the household green energy generation apparatus as well as electrical energy supplied from an electric utility company.

20. The electric storage apparatus according to claim 12, wherein
the certificate of electric-storage issuance unit further comprises:
a storage unit for storing a private key, and a public key that has been certified by the certificate authority;
a signature generation unit for generating a digital signature using a private key that has been acquired from the storage unit; and
a certificate generation unit for generating the certificate of electric-storage with an addition of a digital signature to information on the discharged electrical energy.

21. A management method for green energy information, comprising the steps of:
acquiring electric-generation capacity information that indicates electric-generation capacity measured by a electric-generation capacity measurement unit from a household green energy generation unit, which includes a household green energy generation unit for generating electrical energy using renewable energy or environmentally friendly resources and the electric-generation capacity measurement unit for measuring electric-generation capacity generated by the household green energy generation unit;

issuing a certificate of electric-generation in order to authenticate that the electric-generation capacity acquired in the step of the acquiring electric-generation capacity information is generated by the household green energy generation unit; and providing the certificate of electric-generation issued by the certificate of electric-generation issuance unit to an electric storage apparatus when electrical energy generated by the household green energy generation unit is transmitted to the electric storage apparatus.

22. A system which combines a green energy apparatus and electric storage apparatus, comprising:

the green energy apparatus which includes a household green energy generation unit for generating electrical energy using renewable energy or environmentally friendly resources, an electric-generation capacity measurement unit for measuring electric-generation capacity generated by the household green energy generation unit, and a certificate of electric-generation issuance unit for acquiring electric-generation capacity information that indicates the electric-generation capacity measured by the electric-generation capacity measurement unit and for issuing a certificate of electric-generation that certifies the acquired electric-generation capacity is generated by the household green energy generation unit; and the electric storage apparatus which includes a battery to be charged upon supply of electrical energy generated by the household green energy generation unit, and a certificate acquisition unit for acquiring the certification of electric-generation issued by the certificate of electric-generation issuance unit when the battery is charged upon supply of electrical energy generated by the household green energy generation unit.

* * * * *